(12) United States Patent
Takahashi

(10) Patent No.: US 9,235,749 B2
(45) Date of Patent: Jan. 12, 2016

(54) IMAGE PROCESSING DEVICE AND IMAGE PROCESSING METHOD

(75) Inventor: Yoshitomo Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 111 days.

(21) Appl. No.: 13/984,316

(22) PCT Filed: Feb. 16, 2012

(86) PCT No.: PCT/JP2012/053685
§ 371 (c)(1),
(2), (4) Date: Aug. 8, 2013

(87) PCT Pub. No.: WO2012/114975
PCT Pub. Date: Aug. 30, 2012

(65) Prior Publication Data
US 2013/0315473 A1    Nov. 28, 2013

(30) Foreign Application Priority Data
Feb. 24, 2011    (JP) .................................. 2011-038670

(51) Int. Cl.
*G06K 9/00* (2006.01)
*G06T 15/20* (2011.01)
*H04N 13/00* (2006.01)

(52) U.S. Cl.
CPC .......... *G06K 9/00201* (2013.01); *G06T 15/205* (2013.01); *H04N 13/0011* (2013.01); *H04N 2213/005* (2013.01)

(58) Field of Classification Search
USPC ........................................................ 382/154
See application file for complete search history.

(56) References Cited

U.S. PATENT DOCUMENTS

| 5,604,856 A | * | 2/1997 | Guenter ......................... 345/473 |
| 6,016,150 A | * | 1/2000 | Lengyel et al. ............... 345/426 |

(Continued)

FOREIGN PATENT DOCUMENTS

| JP | 07-282259 | 10/1995 |
| JP | 2004-525437 | 8/2004 |

(Continued)

OTHER PUBLICATIONS

Bruls et al., Creation of LDV streams out of MV sequences. International Organisation for Standarisation Coding of Moving Pictures and Audio. Hannover, Jul. 2008. 6 pages.

(Continued)

*Primary Examiner* — Alex Liew
(74) *Attorney, Agent, or Firm* — Sony Corporation

(57) ABSTRACT

The present technique relates to an image processing device and an image processing method that enable generation of high-quality color images and depth images of the viewpoints other than the reference point on the receiving end even if the precision of the reference-point depth image is low when the occlusion regions of color images and depth images of the viewpoints other than the reference point are transmitted. A warping unit performs a foreground-prioritized warping operation toward the left viewpoint on the reference-point depth image. Using the reference-point depth image of the left viewpoint obtained as a result of the warping operation, an occlusion determining unit detects a left-viewpoint occlusion region that appears when a viewpoint is converted from the reference point to the left viewpoint. The present technique can be applied to 3D image processing devices, for example.

9 Claims, 23 Drawing Sheets

(56) References Cited

U.S. PATENT DOCUMENTS

| | | | |
|---|---|---|---|
| 6,064,393 A * | 5/2000 | Lengyel et al. | 345/427 |
| 6,262,409 B1 * | 7/2001 | Avaro et al. | 250/208.1 |
| 6,417,850 B1 * | 7/2002 | Kang | 345/422 |
| 6,445,815 B1 * | 9/2002 | Sato | 382/154 |
| 2002/0061131 A1 * | 5/2002 | Sawhney et al. | 382/154 |
| 2003/0034976 A1 * | 2/2003 | Raskar et al. | 345/427 |
| 2004/0222987 A1 * | 11/2004 | Chang et al. | 345/419 |
| 2004/0264806 A1 * | 12/2004 | Herley | 382/284 |
| 2009/0129667 A1 * | 5/2009 | Ho et al. | 382/154 |
| 2010/0027898 A1 * | 2/2010 | Lee et al. | 382/236 |
| 2011/0115886 A1 * | 5/2011 | Nguyen et al. | 348/47 |
| 2012/0020549 A1 * | 1/2012 | Lee et al. | 382/154 |
| 2012/0033872 A1 * | 2/2012 | Cho et al. | 382/154 |
| 2012/0039528 A1 * | 2/2012 | Lee et al. | 382/162 |
| 2012/0170841 A1 * | 7/2012 | Lee et al. | 382/166 |

FOREIGN PATENT DOCUMENTS

| | | |
|---|---|---|
| JP | 2010-508752 | 3/2010 |
| JP | 2010-157823 | 7/2010 |

OTHER PUBLICATIONS

Bruls et al., Basic LDV view-synthesis/renderer SW : LDVS. International Organisation for Standarisation Coding of Moving Pictures and Audio. Lausanne, Feb. 2009. 13 pages.

\* cited by examiner

IMAGE PROCESSING DEVICE AND IMAGE PROCESSING METHOD

TECHNICAL FIELD

The present technique relates to image processing devices and image processing methods, and more particularly, to an image processing device and an image processing method that enable generation of high-quality color images and depth images of the viewpoints other than the reference point on the receiving end even if the precision of the reference-point depth image is low when the occlusion regions of color images and depth images of the viewpoints other than the reference point are transmitted.

BACKGROUND ART

In recent years, attention is being paid to 3D images. As a popular technique for viewing such 3D images, there is currently a technique by which a viewer views images of two viewpoints that are alternately displayed. In viewing the images of two viewpoints, the viewer wears glasses that open the shutter for the left eye when one of the images of two viewpoints is displayed, and open the shutter for the right eye when the other one of the images is displayed (hereinafter referred to as the glasses-involving technique).

However, with such a glasses-involving technique, a viewer needs to purchase glasses as well as a 3D image display device, and this reduces the viewer's purchasing interest. Also, the need to wear glasses at the time of viewing is troublesome for a viewer. Therefore, there is an increasing demand for a viewing technique by which a viewer can view 3D images without glasses (hereinafter referred to as a glasses-free technique).

By the glasses-free technique, images of three or more viewpoints are displayed in such a manner that the viewable angle varies at the respective viewpoints, and the viewer can view a 3D image without glasses by seeing each image of any two viewpoints with the right and left eyes.

Also, 3D images compliant with the glasses-free technique are now about to be standardized as MPEG (Moving Picture Experts Group phase) 3DV. In MPEG 3DV, transmission of multi-view color images and depth images is to be standardized. A depth image is an image that indicates the depth value (depth information) of each pixel in a color image of a predetermined viewpoint, and a depth value (depth information) is a value that represents the position of the object in the depth direction.

To decode multi-view color images and depth images, a high-performance decoding device is required. For example, to decode color images and depth images of three viewpoints, a decoding device that has an ability to decode images of six viewpoints is required. At present, however, there exist only decoding devices that are capable of decoding color images of two viewpoints.

Also, to transmit multi-view color images and depth images as a baseband, wideband transmission needs to be performed. For example, to transmit color images and depth images of three viewpoints as a baseband, images of six viewpoints need to be transmitted. At present, however, there exist only devices that are capable of transmitting color images of two viewpoints.

Therefore, it is difficult to encode, transmit, and decode multi-view color images and depth images as a baseband, and it is necessary to reduce the baseband data amount.

In view of this, there is a method of reducing the baseband data amount by generating an LDV (Layered Depth Video) as a baseband. By this method, an LDV formed with a color image and a depth image of a reference viewpoint (hereinafter referred to as the reference point), and occlusion regions (described later in detail) of color images and depth images of the viewpoints other than the reference point is generated as a baseband.

Specifically, multi-view color images and depth images are images of the same scenery viewed from different viewpoints. Therefore, the regions other than the occlusion region in the multi-view color images overlap with one another, and the regions other than the occlusion region in the multi-view depth images overlap with one another. In view of this, an LDV formed with a color image and a depth image of the reference point, and the occlusion regions of color images and depth images of the viewpoints other than the reference point is generated as a baseband, instead of multi-view color images and depth images.

An occlusion region is a region that appears due to a change in positional relationship between the foreground and the background at the time of a change in viewpoint, exists in an image of a viewpoint, but does not exist in an image of another viewpoint. That is, an occlusion region is a background that is hidden by a foreground in an image of a viewpoint prior to a change, but is not hidden by the foreground in the image of the viewpoint after the change.

Non-Patent Document 1 discloses a method of generating an LDV from multi-view color images and depth images. Non-Patent Document 2 discloses a method of restoring multi-view color images and depth images from an LDV.

FIG. 1 is a block diagram showing an example structure of an image processing system that generates an LDV from multi-view color images and depth images, encodes the LDV, and decodes the LDV to restore the multi-view color images and depth images.

The image processing system 10 shown in FIG. 1 includes a format conversion device 11, a multi-view image encoding device 12, a multi-view image decoding device 13, and an inverse format conversion device 14.

Multi-view color images and depth images are input to the format conversion device 11 of the image processing system 10. The format conversion device 11 performs a baseband converting operation. Specifically, the format conversion device 11 generates an LDV as a baseband from the multi-view color images and depth images. As a result, the baseband data amount is reduced. The format conversion device 11 supplies the color image of the reference point in the LDV as the reference-point color image to the multi-view image encoding device 12, and supplies the depth image of the reference point as the reference-point depth image to the multi-view image encoding device 12.

The format conversion device 11 also multiplexes the occlusion regions of the color images of the viewpoints other than the reference point in the LDV into one screen, and supplies the resultant image as the background color image to the multi-view image encoding device 12. The format conversion device 11 multiplexes the occlusion regions of the depth images of the viewpoints other than the reference point in the LDV into one screen, and supplies the resultant image as the background depth image to the multi-view image encoding device 12.

The multi-view image encoding device 12 encodes, by the MVC (Multiview Video Coding) technique or the like, the reference-point color image, the reference-point depth image, the background color image, and the background depth image, which are supplied from the format conversion device 11. The multi-view image encoding device 12 transmits the resultant bit stream to the multi-view image decoding device 13.

The multi-view image decoding device 13 receives the bit stream transmitted from the multi-view image encoding device 12, and decodes the bit stream by a technique compatible with the MVC technique. The multi-view image decoding device 13 supplies the resultant reference-point color image, reference-point depth image, background color image, and background depth image to the inverse format conversion device 14.

The inverse format conversion device 14 performs an inverse baseband converting operation compatible with the baseband converting operation performed by the format conversion device 11, on the reference-point color image, the reference-point depth image, the background color image, and the background depth image, which are supplied from the multi-view image decoding device 13.

The inverse format conversion device 14 then outputs the color images of the viewpoints other than the reference point and the reference-point color image, which are obtained as a result of the inverse baseband converting operation, as multi-view color images. The inverse format conversion device 14 also outputs the depth images of the viewpoints other than the reference point and the reference-point depth image, which are obtained as a result of the inverse baseband converting operation, as multi-view depth images.

FIG. 2 is a block diagram showing an example structure of the format conversion device 11 shown in FIG. 1.

In the following example, there are three viewpoints, one of the two viewpoints other than the reference point is the left viewpoint, and the other one of the two viewpoints is the right viewpoint.

The format conversion device 11 shown in FIG. 2 includes a warping unit 21, an occlusion determining unit 22, a warping unit 23, an occlusion determining unit 24, a screen multiplexing unit 25, and an output unit 26.

The warping unit 21 of the format conversion device 11 performs a background-prioritized warping operation toward the reference point, on the left depth image that is the depth image of the left viewpoint among the multi-view depth images. The resultant reference-point depth image is set as the left depth image of the reference point.

A warping operation is an operation to geometrically transform an image of a certain viewpoint into an image of another viewpoint. A background-prioritized warping operation is an operation to select and associate pixels that are located on the background side in the depth direction and correspond to the object among pixels that belong to an image yet to be subjected to a warping operation and are associated with the same pixel in the image subjected to the warping operation. Here, the pixels that are located on the background side in the depth direction and correspond to the object are the pixels having the smaller depth values.

Using the left depth image of the reference point, the warping unit 21 also performs a background-prioritized warping operation toward the reference point, on the left color image that is the color image of the left viewpoint among the multi-view color images. The resultant reference-point color image is set as the left color image of the reference point. The warping unit 21 then supplies the left depth image of the reference point and the left color image of the reference point to the occlusion determining unit 22.

Based on the left depth image of the reference point supplied from the warping unit 21 and the reference-point depth image among the multi-view color images that are input from outside, the occlusion determining unit 22 detects an occlusion region that appears when the viewpoint is converted from the reference point to the left viewpoint (hereinafter referred to as the left-viewpoint occlusion region). Specifically, the occlusion determining unit 22 detects the left-viewpoint occlusion region that is the region formed with pixels with which the value obtained by subtracting the depth value of the left depth image of the reference point from the depth value of the reference-point depth image is equal to or greater than a predetermined value.

That is, the warping unit 21 performs a background-prioritized warping operation on the left depth image. Accordingly, the left-viewpoint occlusion region that is the foreground in the reference-depth image in the left depth image of the reference point but is the background in the left depth image is the depth value of the background. Meanwhile, the left-viewpoint occlusion region of the reference-point depth image is the depth value of the foreground. Accordingly, the pixels with which the value obtained by subtracting the depth value of the left depth image of the reference point from the depth value of the reference-point depth image is equal to or greater than the minimum value that is assumed to be the difference between the depth value of the background and the depth value of the foreground are regarded as the pixels in the left-viewpoint occlusion region.

The occlusion determining unit 22 supplies the left-viewpoint occlusion region of the left color image of the reference point as the left color occlusion image to the screen multiplexing unit 25. The occlusion determining unit 22 also supplies the left-viewpoint occlusion region of the left depth image of the reference point as the left depth occlusion image to the screen multiplexing unit 25.

The warping unit 23 performs background-prioritized warping operations toward the reference point, on the right color image and the right depth image among the multi-view color images, like the warping unit 21. The warping unit 23 sets the resultant reference-point color image as the right color image of the reference point, and the reference-point depth image as the right depth image of the reference point, and supplies the right color image of the reference point and the right depth image of the reference point to the occlusion determining unit 24.

Based on the right depth image of the reference point and the reference-point depth image supplied from the warping unit 23, the occlusion determining unit 24 detects, like the occlusion determining unit 22, an occlusion region that appears when the viewpoint is converted from the reference point to the right viewpoint (hereinafter referred to as the right-viewpoint occlusion region).

The occlusion determining unit 24 supplies the right-viewpoint occlusion region of the right color image of the reference point as the right color occlusion image to the screen multiplexing unit 25. The occlusion determining unit 24 supplies the right-viewpoint occlusion region of the right depth image of the reference point as the right depth occlusion image to the screen multiplexing unit 25.

The screen multiplexing unit 25 multiplexes the left color occlusion image supplied from the occlusion determining unit 22 and the right color occlusion image supplied from the occlusion determining unit 24 into one screen. Specifically, the screen multiplexing unit 25 sets the pixel values of the pixels that have pixel values only in one of the left color occlusion image and the right color occlusion image, as the pixel values of the one occlusion image. The screen multiplexing unit 25 also sets the pixel values of the pixels that have pixel values in both the left color occlusion image and the right color occlusion image, as the pixel values of one of the occlusion images. The screen multiplexing unit 25 supplies the multiplexed image of the left color occlusion image and the right color occlusion image as the background color image to the multi-view image encoding device 12 (FIG. 1).

Likewise, the screen multiplexing unit 25 multiplexes the left depth occlusion image supplied from the occlusion determining unit 22 and the right depth occlusion image supplied from the occlusion determining unit 24 into one screen. The screen multiplexing unit 25 supplies the resultant multiplexed image as the background depth image to the multi-view image encoding device 12.

The output unit 26 supplies the reference-point color image and the reference-point depth image among the multi-view color images that are input from outside, to the multi-view image encoding device 12.

FIG. 3 is a block diagram showing an example structure of the inverse format conversion device 14 shown in FIG. 1.

The inverse format conversion device 14 shown in FIG. 3 includes a warping unit 31, a screen combining unit 32, a warping unit 33, a screen combining unit 34, and an output unit 35.

The warping unit 31 of the inverse format conversion device 14 receives the reference-point depth image and the reference-point depth image supplied from the multi-view image decoding device 13. The warping unit 31 functions as the first non-reference viewpoint warping unit that performs a foreground-prioritized warping operation toward the left viewpoint on the reference-point depth image, and sets the resultant left-viewpoint depth image as the reference-point depth image of the left viewpoint.

A foreground-prioritized warping operation is an operation to select and associate pixels that are located on the foreground side in the depth direction and correspond to the object among pixels that belong to an image yet to be subjected to a warping operation and are associated with the same pixel in the image subjected to the warping operation. Here, the pixels that are located on the foreground side in the depth direction and correspond to the object are the pixels having the larger depth values.

The foreground-prioritized operation is a conventional warping operation. This is because, when pixels in an image yet to be subjected to a warping operation are associated with the same pixel in the image subjected to the warping operation, the pixels are such pixels that the foreground is overlapped on the background and hides the background.

Using the reference-point depth image of the left viewpoint, the warping unit 31 performs a foreground-prioritized warping operation toward the left viewpoint on the reference-point color image supplied from the multi-view image decoding device 13. The resultant left-viewpoint color image is set as the reference-point color image of the left viewpoint. The warping unit 31 then supplies the reference-point color image of the left viewpoint and the reference-point depth image of the left viewpoint to the screen combining unit 32.

Likewise, the warping unit 31 performs foreground-prioritized warping operations toward the right viewpoint on the reference-point color image and the reference-point depth image supplied from the multi-view image decoding device 13. The warping unit 31 sets the right-viewpoint color image obtained as a result of the warping operation as the reference-point color image of the right viewpoint, and the right-viewpoint depth image as the reference-point depth image of the right viewpoint, and supplies those images to the screen combining unit 34.

The screen combining unit 32 combines the reference-point color image of the left viewpoint supplied from the warping unit 31 with the background color image of the left viewpoint supplied from the warping unit 33. Specifically, the screen combining unit 32 sets the pixel values of the pixels that have pixel values only in one of the reference-point color image of the left viewpoint and the background color image of the left viewpoint, as the pixel values of the one of the color images. The screen combining unit 32 also sets the pixel values of the pixels that have pixel values in both the reference-point color image of the left viewpoint and the background color image of the left viewpoint, as the pixel values of the reference-point color image of the left viewpoint. This is because the position of the object corresponding to the reference-point color image in the depth direction is always on the foreground side of the position of the object corresponding to the background color image in the depth direction.

Likewise, the screen combining unit 32 combines the reference-point depth image of the left viewpoint supplied from the warping unit 31 with the background depth image of the left viewpoint supplied from the warping unit 33. The screen combining unit 32 outputs the color image obtained as a result of the combining as the left color image, and the depth image as the left depth image.

Like the warping unit 31, the warping unit 33 performs foreground-prioritized warping operations toward the left viewpoint and the right viewpoint, on the background color image and the background depth image supplied from the multi-view image decoding device 13. The warping unit 33 sets the left-viewpoint color image obtained as a result of the warping operation as the background color image of the left viewpoint, and the left-viewpoint depth image as the background depth image of the left viewpoint, and supplies those images to the screen combining unit 32. The warping unit 33 also sets the right-viewpoint color image obtained as a result of the warping operation as the background color image of the right viewpoint, and the right-viewpoint depth image as the background depth image of the right viewpoint, and supplies those images to the screen combining unit 34.

Like the screen combining unit 32, the screen combining unit 34 combines the reference-point color image of the right viewpoint supplied from the warping unit 31 with the background color image of the right viewpoint supplied from the warping unit 33. Likewise, the screen combining unit 34 combines the reference-point depth image of the right viewpoint supplied from the warping unit 31 with the background depth image of the right viewpoint supplied from the warping unit 33. The screen combining unit 32 outputs the color image obtained as a result of the combining as the right color image, and the depth image as the right depth image.

The output unit 35 outputs the reference-point color image and the reference-point depth image supplied from multi-view image decoding device 13.

CITATION LIST

Non-Patent Documents

Non-Patent Document 1: Fons Bruls, Lincoln Lobo, Rene Klein Gunnewiek, INTERNATIONAL ORGANISATION FOR STANDARDISATION ORGANISATION INTERNATIONALE DE NORMALISATION ISO/IEC JTC1/SC29/WG11 CODING OF MOVING PICTURES AND AUDIO, ISO/IEC JTC1/SC29/WG11, MPEG2008/M15590, July 2008, Hannover Non-Patent Document 2: Fons Bruls, Chris Varekamp, Rene Klein Gunnewiek, Lincoln Lobo, Yin Zhao, Lu Yu, INTERNATIONAL ORGANISATION FOR STANDARDISATION ORGANISATION INTERNATIONALE DE NORMALISATION ISO/IEC JTC1/SC29/WG11

CODING OF MOVING PICTURES AND AUDIO, ISO/IEC JTC1/SC29/WG11, MPEG2009/M16034, February 2009, Lausanne

SUMMARY OF THE INVENTION

Problems to be Solved by the Invention

In the above described image processing system 10, when the precision of the reference-point depth image is low, the left color image, the left depth image, the right color image, and the right depth image, which are restored at the inverse format conversion device 14, might have poor image quality.

Referring now to FIG. 4, a specific example is described. In the example shown in FIG. 4, the reference-point depth image is a depth image that is obtained when an image of a spherical object located as the foreground at the center of a predetermined background is captured.

As shown in FIG. 4, the format conversion device 11 detects a left-viewpoint occlusion region 41 by generating the left depth image of the reference point from the left depth image, and detects a right-viewpoint occlusion region 42 by generating the right depth image of the reference point from the right depth image. The left-viewpoint occlusion region 41 of the left depth image of the reference point and the right-viewpoint occlusion region 42 of the right depth image of the reference point are multiplexed on one screen, to generate the background depth image. At the inverse format conversion device 14, the reference-point depth image of the left viewpoint is generated from the reference-point depth image, and the left-viewpoint occlusion region 43 that appears at the time of the generation is interpolated with the left-viewpoint occlusion region 41 of the background depth image.

However, when the depth value of the reference-point depth image differs from the actual value, for example, the position of the circular region having a predetermined depth value other than 0 in the reference-point depth image of the left viewpoint shifts rightward from the position in the left depth image by a predetermined distance, as shown in FIG. 4. As a result, the left-viewpoint occlusion region 43 that appears in the reference-point depth image of the left viewpoint becomes larger than the left-viewpoint occlusion region 41 in the background depth image, and a region where no depth values exist appears in the reference-point depth image of the left viewpoint after the interpolation performed with the background depth image. That is, the reference-point depth image of the left viewpoint is broken. The same applies to the left-viewpoint color image, the reference-point depth image of the right viewpoint, and the right-viewpoint color image.

The present technique has been developed in view of such circumstances, and the object thereof is to enable generation of high-quality color images and depth images of the viewpoints other than the reference point on the receiving end even if the precision of the reference-point depth image is low when the occlusion regions of color images and depth images of the viewpoints other than the reference point are transmitted.

Solutions to Problems

An image processing device of a first aspect of the present technique is an image processing device that includes: a non-reference viewpoint warping unit that performs a warping operation toward a non-reference viewpoint on a depth image or a color image of a reference viewpoint, the reference viewpoint being a viewpoint serving as a reference point, the non-reference viewpoint being a viewpoint other than the reference viewpoint; a detecting unit that detects an occlusion region by using a depth image or a color image of the non-reference viewpoint obtained through the warping operation performed by the non-reference viewpoint warping unit, the occlusion region being formed when a viewpoint is converted from the reference viewpoint to the non-reference viewpoint; and a transmitting unit that transmits the occlusion region of the depth image of the non-reference viewpoint.

An image processing method of the first aspect of the present technique is compatible with the image processing device of the first aspect of the present technique.

In the first aspect of the present technique, a warping operation toward a non-reference viewpoint that is a viewpoint other than the reference viewpoint is performed on a depth image or a color image of the reference viewpoint that is a viewpoint serving as the reference point, and the occlusion region that is formed when a viewpoint is converted from the reference viewpoint to the non-reference viewpoint is detected by using a depth image or a color image of the non-reference viewpoint obtained through the warping operation. The occlusion region of the depth image of the non-reference viewpoint is then transmitted.

An image processing device of a second aspect of the present technique is an image processing device that includes: a receiving unit that receives a depth multiplexed image formed by multiplexing a first occlusion region of a depth image of a reference viewpoint and a second occlusion region of the depth image of the reference viewpoint, the first occlusion region being obtained by performing a warping operation toward the reference viewpoint on the first occlusion region of a depth image of a first non-reference viewpoint that is a viewpoint other than the reference viewpoint serving as the reference point, the first occlusion region of the depth image of the first non-reference viewpoint being formed when a viewpoint is converted from the reference viewpoint to the first non-reference viewpoint, the second occlusion region being obtained by performing a warping operation toward the reference viewpoint on the second occlusion region of a depth image of a second non-reference viewpoint that is a viewpoint other than the reference viewpoint and the first non-reference viewpoint, the second occlusion region of the depth image of the second non-reference viewpoint being formed when a viewpoint is converted from the reference viewpoint to the second non-reference viewpoint; a first non-reference viewpoint warping unit that performs a warping operation toward the first non-reference viewpoint on the depth image of the reference viewpoint; a second non-reference viewpoint warping unit that performs a warping operation toward the second non-reference viewpoint on the depth image of the reference viewpoint; a first combining unit that combines the depth image of the first non-reference viewpoint obtained through the warping operation performed by the first non-reference viewpoint warping unit, with the first occlusion region of the depth multiplexed image; and a second combining unit that combines the depth image of the second non-reference viewpoint obtained through the warping operation performed by the second non-reference viewpoint warping unit, with the second occlusion region of the depth multiplexed image.

An image processing method of the second aspect of the present technique is compatible with the image processing device of the second aspect of the present technique.

In the second aspect of the present technique, a depth multiplexed image formed by multiplexing a first occlusion region of a depth image of a reference viewpoint serving as the reference point and a second occlusion region of the depth image of the reference viewpoint is received, the first occlusion region being obtained by performing a warping operation toward the reference viewpoint on the first occlusion region of a depth image of a first non-reference viewpoint that is a viewpoint other than the reference viewpoint, the first occlusion region of the depth image of the first non-reference viewpoint being formed when a viewpoint is converted from the reference viewpoint to the first non-reference viewpoint, the second occlusion region being obtained by performing a warping operation toward the reference viewpoint on the second occlusion region of a depth image of a second non-reference viewpoint that is a viewpoint other than the reference viewpoint and the first non-reference viewpoint, the second occlusion region of the depth image of the second non-reference viewpoint being formed when a viewpoint is converted from the reference viewpoint to the second non-reference viewpoint. A warping operation toward the first non-reference viewpoint is performed on the depth image of the reference viewpoint, and a warping operation toward the second non-reference viewpoint is performed on the depth image of the reference viewpoint. The depth image of the first non-reference viewpoint obtained through the warping operation is combined with the first occlusion region of the depth multiplexed image, and the depth image of the second non-reference viewpoint obtained through the warping operation is combined with the second occlusion region of the depth multiplexed image.

Effects of the Invention

According to the first aspect of the present technique, occlusion regions of color images and depth images of viewpoints other than the reference point can be transmitted so that high-quality color images and depth images of the viewpoints other than the reference point can be generated on the receiving end, even if the precision of the reference-point depth image is low.

According to the second aspect of the present technique, high-quality color images and depth images of viewpoints other than the reference point can be generated even if the precision of the reference-point depth image is low when the occlusion regions of color images and depth images of the viewpoints other than the reference point are transmitted.

MODES FOR CARRYING OUT THE INVENTION

<Description of Depth Images in this Specification>

Figure 19:
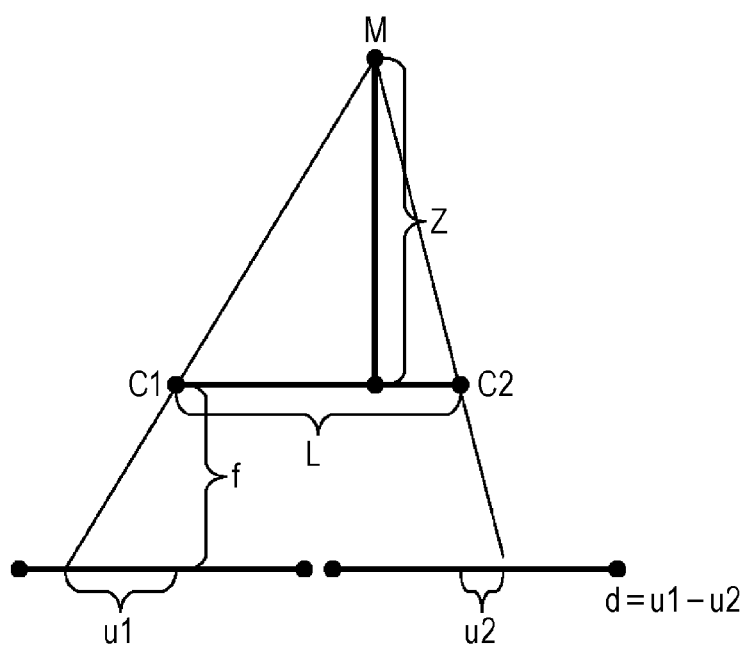
FIG. 19 is a diagram for explaining parallax and depth.

FIG. 19 is a diagram for explaining parallax and depth.

As shown in FIG. 19, when a color image of an object M is captured by a camera c1 located in a position C1 and a camera c2 located in a position C2, the object M has a depth Z, which is the distance from the camera c1 (the camera c2) in the depth direction, and is defined by the following equation (a).

$$Z=(L/d)\times f \qquad (a)$$

Here, L represents the horizontal distance between the position C1 and the position C2 (hereinafter referred to as the inter-camera distance). Meanwhile, d represents the value obtained by subtracting the horizontal distance u2 between the position of the object M in the image captured by the camera c2 and the center of the captured image, from the horizontal distance u1 between the position of the object M in the image captured by the camera c1 and the center of the captured image. That is, d represents the parallax. Further, f represents the focal length of the camera c1, and, in the equation (a), the focal lengths of the camera c1 and the camera c2 are the same.

As shown in the equation (a), the parallax d and the depth Z can be uniquely converted. Therefore, in this specification, the image representing the parallax d and the image representing the depth Z of the color image of two viewpoints captured by the camera c1 and the camera c2 are collectively referred to as depth images.

A depth image is an image representing the parallax d or the depth Z, and a pixel value in a depth image (a parallax image) is not the parallax d or the depth Z but may be a value obtained by normalizing the parallax d, a value obtained by normalizing the reciprocal 1/Z of the depth Z, or the like.

A value obtained by normalizing the parallax d with 8 bits (0 through 255) can be calculated according to the equation (b) shown below. Here, the number of normalization bits of the parallax d is not limited to 8, and may be some other number, such as 10 or 12.

[Mathematical Formula 3] (b)

$$I = \frac{255 \times (d - D_{min})}{D_{max} - D_{min}}$$

In the equation (b), $D_{max}$ represents the maximum value of the parallax d, and $D_{min}$ represents the minimum value of the parallax d. The maximum value $D_{max}$ and the minimum value $D_{min}$ may be set for each one screen, or may be set once every few screens.

A value y obtained by normalizing the reciprocal 1/Z of the depth Z with 8 bits (0 through 255) can be determined according to the equation (c) shown below. Here, the number of normalization bits of the reciprocal 1/Z of the depth Z is not limited to 8, and may be some other number, such as 10 or 12.

[Mathematical Formula 4] (c)

$$y = 255 \times \frac{\frac{1}{Z} - \frac{1}{Z_{far}}}{\frac{1}{Z_{near}} - \frac{1}{Z_{far}}}$$

In the equation (c), $Z_{far}$ represents the maximum value of the depth Z, and $Z_{near}$ represents the minimum value of the depth Z. The maximum value $Z_{far}$ and the minimum value $Z_{near}$ may be set for each one screen, or may be set once every few screens.

As described above, in this specification, an image having a pixel value I obtained by normalizing the parallax d, and an image having a pixel value y obtained by normalizing the reciprocal 1/Z of the depth Z are collectively referred to as depth images, as the parallax d and the depth Z can be uniquely converted. The color format of the depth images is YUV420 or YUV400 format, but may be some other color format.

When attention is focused on the value I or the value y as information, instead of a pixel value in a depth image, the value I or the value y is set as depth information. Further, a map formed by mapping the value I or the value y is set as a depth map.

First Embodiment

Example Structure of an Embodiment of an Image Processing System

Figure 5:
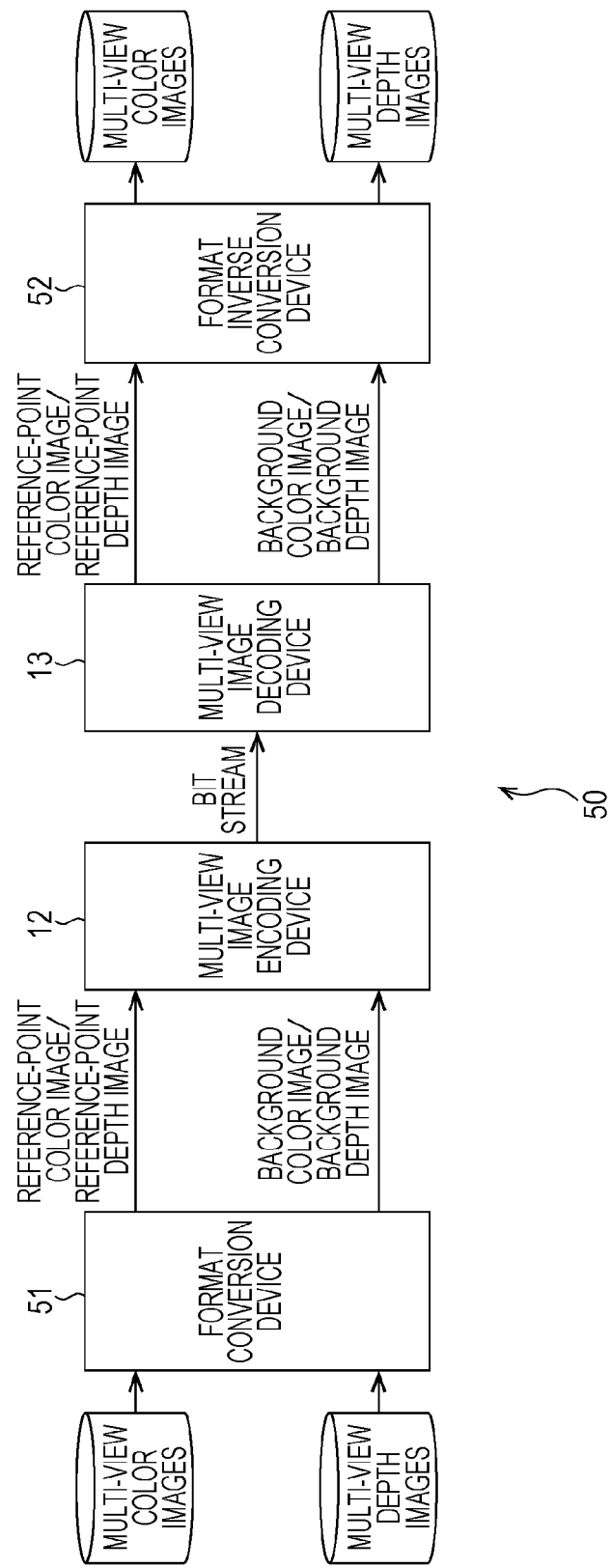
FIG. 5 is a block diagram showing an example structure of an embodiment of an image processing system to which the present technique is applied.

FIG. 5 is a block diagram showing an example structure of an embodiment of an image processing system that includes a transmission device and a reception device as image processing devices to which the present technique is applied.

Figure 1:
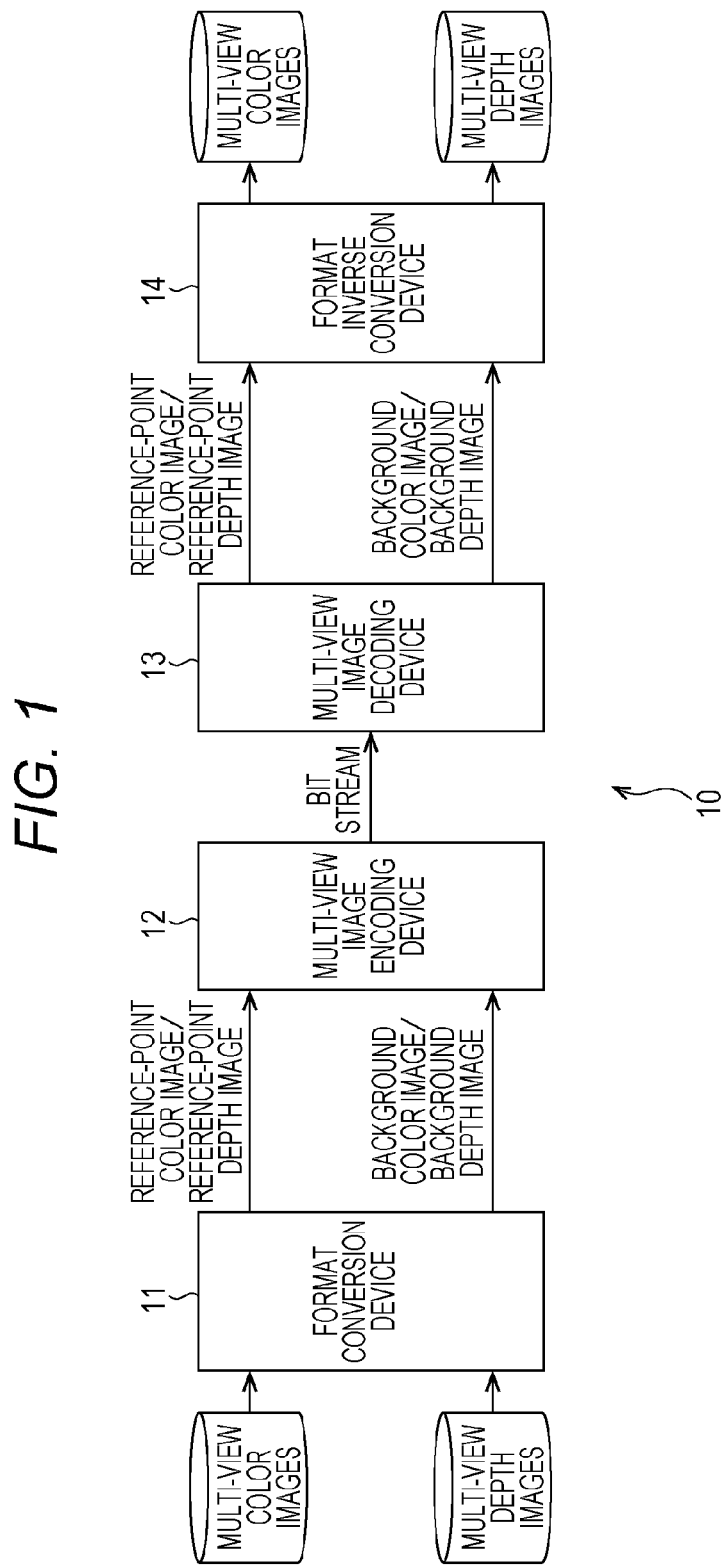
FIG. 1 is a block diagram showing an example structure of a conventional image processing system.

In the structure illustrated in FIG. 5, the same components as those in FIG. 1 are denoted by the same reference numerals as those in FIG. 1. The explanations that have already been made will not be repeated.

The structure of the image processing system 50 shown in FIG. 5 differs from the structure shown in FIG. 1, mainly in that the format conversion device 11 is replaced with a format conversion device 51, and the inverse format conversion device 14 is replaced with an inverse format conversion device 52. In the image processing system 50, the format conversion device 51 detects a left-viewpoint occlusion region and a right-viewpoint occlusion region that appear at the inverse format conversion device 52.

Specifically, the format conversion device 51 and the multi-view image encoding device 12 of the image processing system 50 function as a transmission device. Like the format conversion device 11 shown in FIG. 1, the format conversion device 51 receives multi-view color images and depth images. The format conversion device 51 performs a baseband converting operation.

More specifically, the format conversion device 51 performs foreground-prioritized warping operations toward the left viewpoint and the right viewpoint on the reference-point depth image among the input multi-view depth images. The format conversion device 51 detects the left-viewpoint occlusion region and the right-viewpoint occlusion region from the respective resultant reference-point depth images of the left viewpoint and the right viewpoint. The format conversion device 51 also performs background-prioritized warping operations toward the reference point on the left-viewpoint occlusion region of the left depth image and the right-viewpoint occlusion region of the right depth image among the input multi-view depth images. The resultant images are multiplexed into one screen, and the luminance component of the background depth image is generated. The format conversion device 51 further performs background-prioritized warping operations toward the reference point on the left-viewpoint occlusion region of the left color image and the right-viewpoint occlusion region of the right color image among the input multi-view color images. The resultant images are multiplexed into one screen, and the background color image is thus generated.

When there are overlapping images to be multiplexed, one of the overlapping images is left as a result of the multiplexing performed by the format conversion device 51. In this embodiment, the left depth image and the left color image are left.

The format conversion device 51 also generates right/left specifying information (identification information) indicating that the depth value (or the pixel value) of each pixel in the background depth image (or the background color image) is the depth value of the left depth image (or the left color image) of the reference point, the depth value of the right depth image (or the right color image) of the reference point, or the depth value (or the pixel value) that is common between the left depth image (or the left color image) and the right depth image (or the right color image) of the reference point. The format conversion device 51 sets, for each pixel, the value representing the right/left specifying information as the chrominance component (the chroma component) of the background depth image.

The format conversion device 51 generates, as a baseband, an LDV formed with the background depth image including a depth value as the luminance component and the value representing the right/left specifying information as the chroma component, the background color image, the reference-point color image, and the reference-point depth image. The LDV is supplied to the multi-view image encoding device 12.

The multi-view image decoding device 13 and the inverse format conversion device 52 function as a reception device. The inverse format conversion device 52 performs an inverse baseband converting operation compatible with the baseband converting operation performed by the format conversion device 51, on the reference-point color image, the reference-point depth image, the background color image, and the background depth image, which are obtained as a result of the decoding performed by the multi-view image decoding device 13.

Specifically, based on the right/left specifying information as the chroma component of the background depth image, the inverse format conversion device 52 generates the left depth image and the right depth image from the reference-point depth image and the luminance component of the background depth image. Based on the right/left specifying information and the left depth image, the inverse format conversion device 52 also generates the left color image from the reference-point color image and the background color image. Based on the right/left specifying information and the right depth image, the inverse format conversion device 52 generates the right color image from the reference-point color image and the background color image.

The inverse format conversion device 52 outputs the left color image, the right color image, and the reference-point color image, as multi-view color images. The inverse format conversion device 52 also outputs the left depth image, the right depth image, and the reference-point depth image, as multi-view depth images.

[Operation by the Image Processing System]

Figure 6:
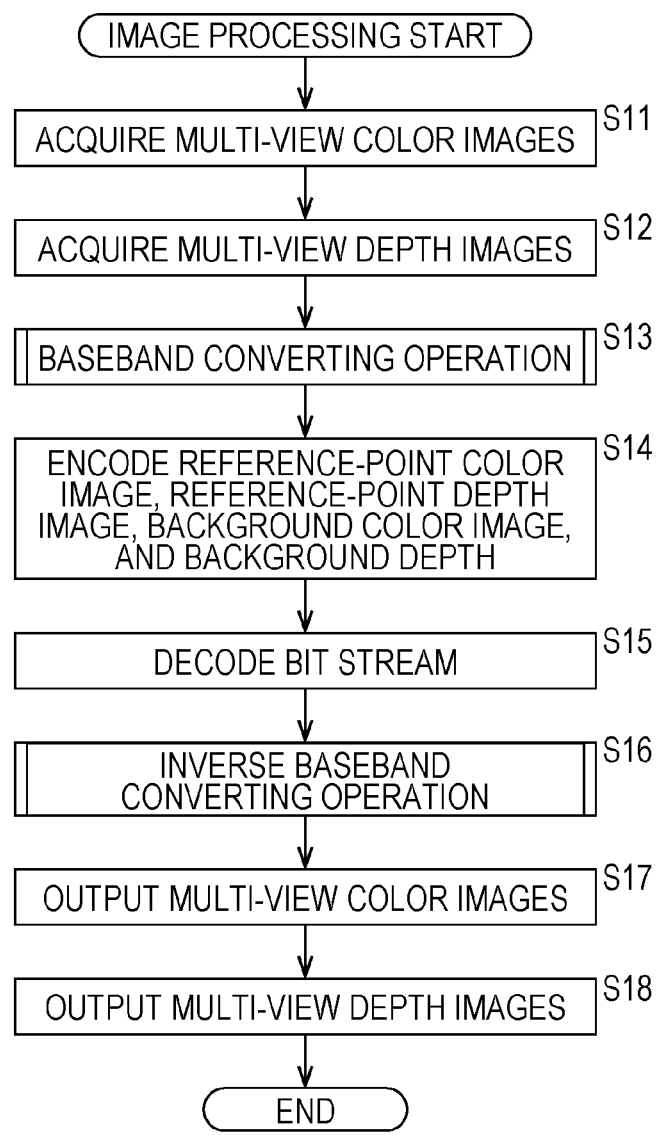
FIG. 6 is a flowchart for explaining an image processing operation to be performed by the image processing system shown in FIG. 5.

FIG. 6 is a flowchart for explaining an image processing operation to be performed by the image processing system 50 shown in FIG. 5. This image processing operation is started when multi-view color images and depth images are input to the image processing system 50, for example.

In step S11 of FIG. 5, the format conversion device 51 of the image processing system 50 acquires the multi-view color images that are input to the image processing system 50. In step S12, the format conversion device 51 acquires the multi-view depth images that are input to the image processing system 50.

In step S13, the format conversion device 51 performs a baseband converting operation on the input multi-view color images and depth images. This baseband converting operation will be described later in detail, with reference to FIG. 12. The format conversion device 51 supplies the baseband that is the LDV that is obtained as a result of the baseband converting operation and is formed with the background color image, the background depth image, the reference-point color image, and the reference-point depth image, to the multi-view image encoding device 12.

In step S14, the multi-view image encoding device 12 encodes, by the MVC technique or the like, the reference-point color image, the reference-point depth image, the background color image, and the background depth image, which are the LDV supplied from the format conversion device 51. The multi-view image encoding device 12 transmits the resultant bit stream to the multi-view image decoding device 13.

In step S15, the multi-view image decoding device 13 receives the bit stream transmitted from the multi-view image encoding device 12, and decodes the bit stream by a technique compatible with the MVC technique. The multi-view image decoding device 13 supplies the resultant reference-point color image, reference-point depth image, background color image, and background depth image to the inverse format conversion device 52.

In step S16, the inverse format conversion device 52 performs an inverse baseband converting operation compatible with the baseband converting operation performed by the format conversion device 51, on the reference-point color image, the reference-point depth image, the background color image, and the background depth image, which are supplied from the multi-view image decoding device 13. The inverse baseband converting operation will be described later in detail, with reference to FIG. 14.

In step S17, the inverse format conversion device 52 outputs the left color image, the right color image, and the reference-point color image, which are obtained as a result of the inverse baseband converting operation, as multi-view color images.

In step S18, the inverse format conversion device 52 outputs the left depth image, the right depth image, and the reference-point depth image, which are obtained as a result of the inverse baseband converting operation, as multi-view depth images. The operation then comes to an end.

[First Specific Example Structure of the Format Conversion Device]

Figure 7:
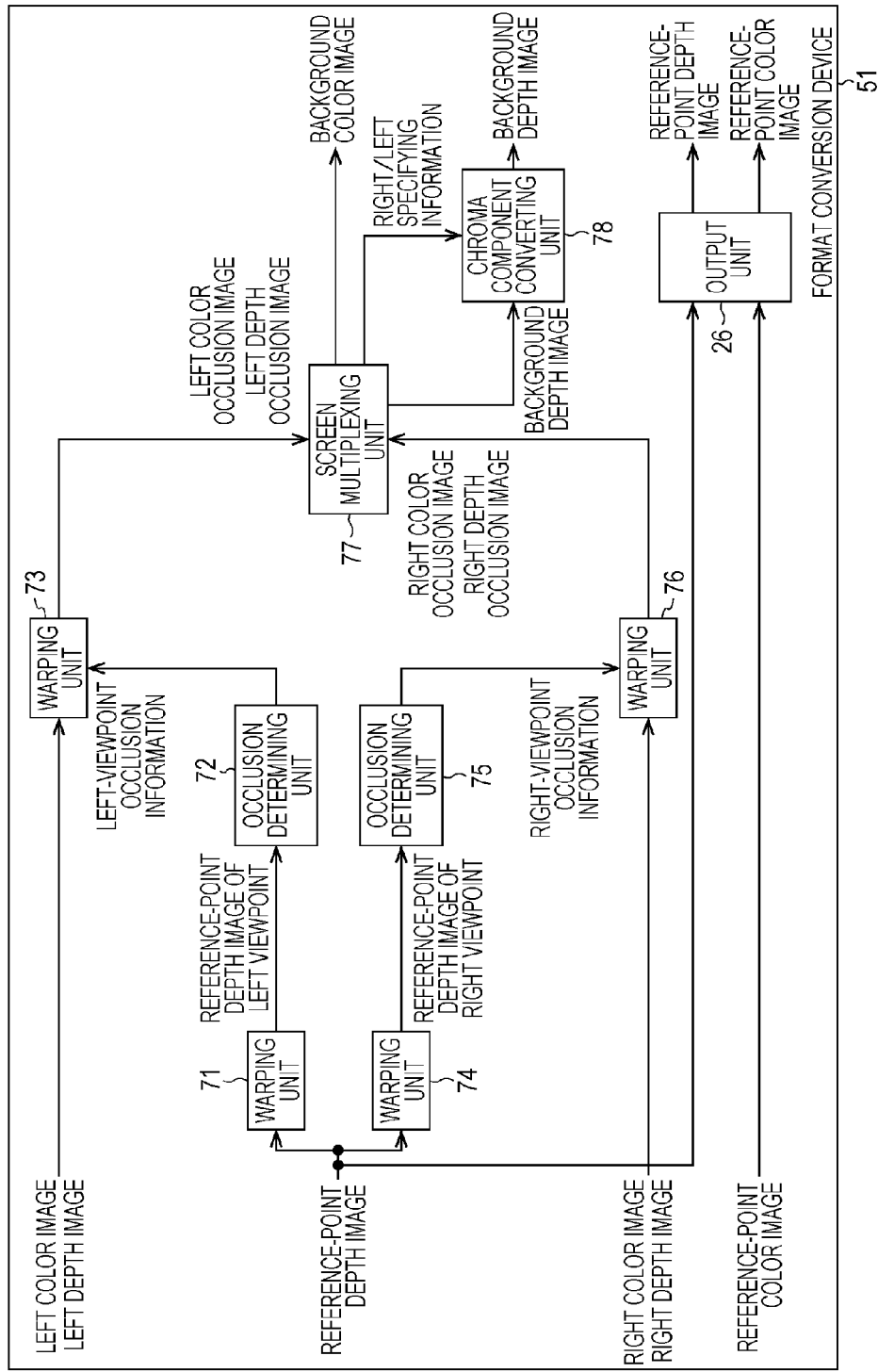
FIG. 7 is a block diagram showing a first specific example structure of the format conversion device shown in FIG. 5.

FIG. 7 is a block diagram showing a first specific example structure of the format conversion device 51 shown in FIG. 5.

Figure 2:
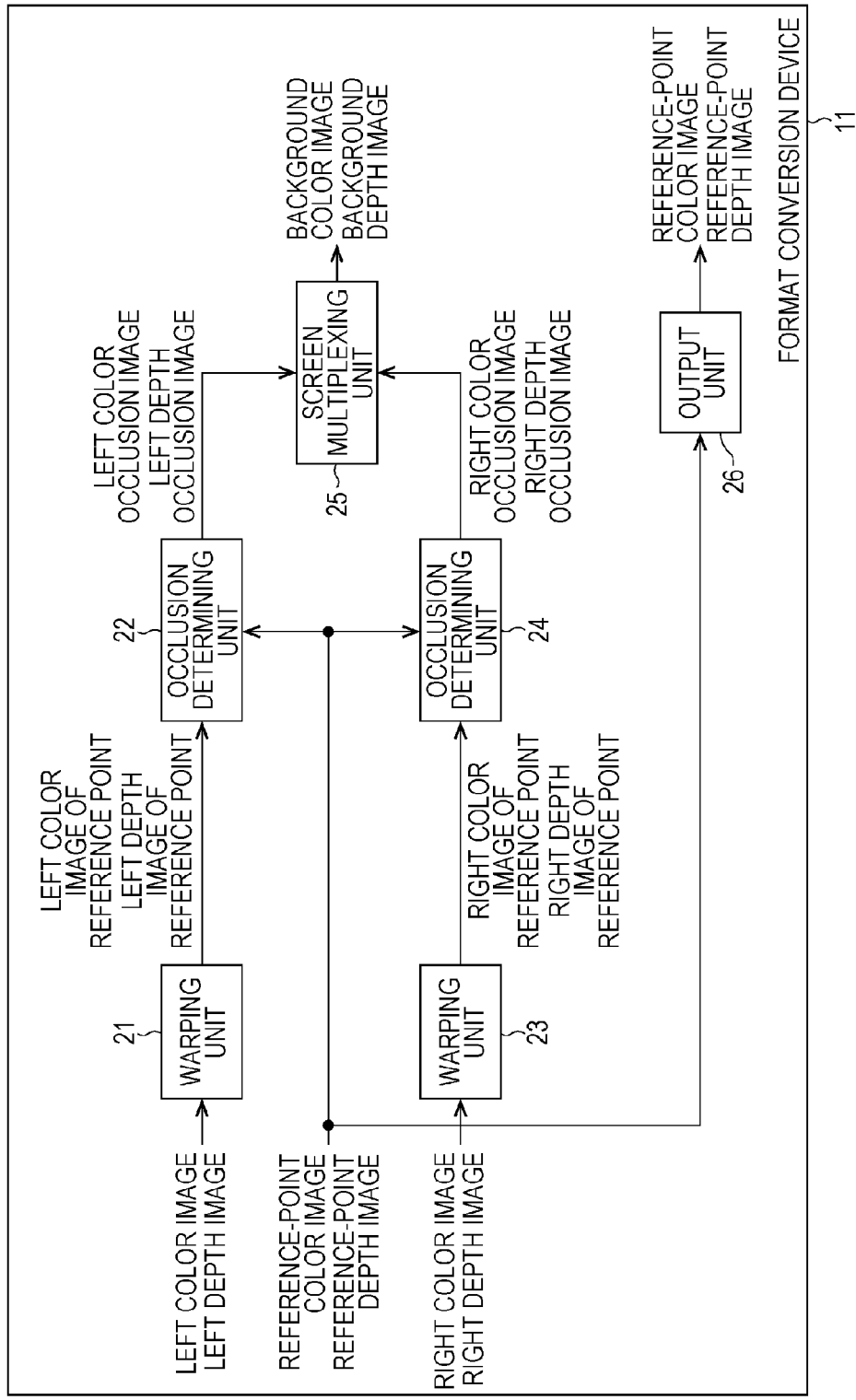
FIG. 2 is a block diagram showing an example structure of the format conversion device shown in FIG. 1.

In the structure illustrated in FIG. 7, the same components as those in FIG. 2 are denoted by the same reference numerals as those in FIG. 2. The explanations that have already been made will not be repeated.

The structure of the format conversion device 51 shown in FIG. 7 differs from the structure shown in FIG. 2, except for the output unit 26.

The warping unit 71 of the format conversion device 51 functions as the non-reference viewpoint warping unit. The warping unit 71 performs a foreground-prioritized warping operation toward the left viewpoint on an input reference-point depth image, and supplies the resultant reference-point depth image of the left viewpoint to the occlusion determining unit 72.

The occlusion determining unit 72 functions as the detecting unit, and detects the left-viewpoint occlusion region formed with the pixels that have no depth values in the reference-point depth image of the left viewpoint supplied from the warping unit 71. The occlusion determining unit 72 also removes depth values by isolated pixel replacement or the like, the depth values being of the pixels that have depth values and have peripheral pixels within the left-viewpoint occlusion region in the reference-point depth image of the left viewpoint. By adding the pixels having the depth values removed to the left-viewpoint occlusion region, the occlusion determining unit 72 corrects the left-viewpoint occlusion region.

That is, the occlusion determining unit 72 adds the pixels having peripheral pixels detected as the left-viewpoint occlusion region among the pixels not detected as the left-viewpoint occlusion region, to the left-viewpoint occlusion region. By doing so, the occlusion determining unit 72 corrects the left-viewpoint occlusion region. Accordingly, even when the precision of the reference-point depth image is low, and depth values are wrongly provided in the original left-viewpoint occlusion region in the reference-point depth image of the left viewpoint, the left-viewpoint occlusion region can be more accurately detected.

The occlusion determining unit 72 also supplies the information for identifying the corrected left-viewpoint occlusion region as left-viewpoint occlusion information to the warping unit 73.

Based on the left-viewpoint occlusion information supplied from the occlusion determining unit 72, the warping unit 73 performs a background-prioritized warping operation toward the reference point on the left-viewpoint occlusion region of an input left depth image. The warping unit 73 supplies the image obtained as a result of the warping operation, as a left depth occlusion image to the screen multiplexing unit 77.

Based on the left-viewpoint occlusion information, the warping unit 73 also performs a background-prioritized warping operation toward the reference point on the left-viewpoint occlusion region of the input left color image, by using the left depth occlusion image. The warping unit 73 supplies the image obtained as a result of the warping operation, as a left color occlusion image to the screen multiplexing unit 77.

The warping unit 74, the occlusion determining unit 75, and the warping unit 76 perform the same operations with respect to the right viewpoint as the operations performed by the warping unit 71, the occlusion determining unit 72, and the warping unit 73.

Specifically, the warping unit 74 functions as the non-reference viewpoint warping unit that performs a foreground-prioritized warping operation toward the right viewpoint on the input reference-point depth image, and supplies the resultant reference-point depth image of the right viewpoint to the occlusion determining unit 75.

The occlusion determining unit 75 functions as the detecting unit, and detects the right-viewpoint occlusion region formed with the pixels that have no depth values in the reference-point depth image of the right viewpoint supplied from the warping unit 74. The occlusion determining unit 75 also removes depth values by isolated pixel replacement or the like, the depth values being of the pixels that have depth values and have peripheral pixels within the right-viewpoint occlusion region in the reference-point depth image of the right viewpoint. By adding the pixels having the depth values removed to the right-viewpoint occlusion region, the occlusion determining unit 75 corrects the right-viewpoint occlusion region. Accordingly, even when the precision of the reference-point depth image is low, and depth values are wrongly provided in the original right-viewpoint occlusion region in the reference-point depth image of the right viewpoint, the right-viewpoint occlusion region can be more accurately detected.

The occlusion determining unit 75 also supplies the information for identifying the corrected right-viewpoint occlusion region as right-viewpoint occlusion information to the warping unit 76.

Based on the right-viewpoint occlusion information supplied from the occlusion determining unit 75, the warping unit 76 performs a background-prioritized warping operation toward the reference point on the right-viewpoint occlusion region of the input right depth image. The warping unit 76 supplies the image obtained as a result of the warping operation, as a right depth occlusion image to the screen multiplexing unit 77.

Based on the right-viewpoint occlusion information, the warping unit 76 also performs a background-prioritized warping operation toward the reference point on the right-viewpoint occlusion region of the input right color image, by using the right depth occlusion image. The warping unit 76 supplies the image obtained as a result of the warping operation, as a right color occlusion image to the screen multiplexing unit 77.

The screen multiplexing unit 77 functions as the multiplexer, and multiplexes the left depth occlusion image supplied from the warping unit 73 and the right depth occlusion image supplied from the warping unit 76 into one screen. The screen multiplexing unit 77 then supplies the resultant background depth image to the chroma component converting unit 78, the background depth image having the depth value of each pixel as a luminance component and a predetermined value as a chroma component. The predetermined value may be 0 or the depth value of the reference-point depth image, for example. The screen multiplexing unit 77 also functions as the setting unit that generates (sets) right/left specifying information for each pixel, and supplies the right/left specifying information to the chroma component converting unit 78.

The screen multiplexing unit 77 also multiplexes the left color occlusion image supplied from the warping unit 73 and the right color occlusion image supplied from the warping unit 76 into one screen. The screen multiplexing unit 77 functions as the transmitting unit, and transmits the image obtained as a result of the multiplexing, as the background color image to the inverse format conversion device 52 via the multi-view image encoding device 12 and the multi-view image decoding device 13.

The chroma component converting unit 78 changes the chroma component of each pixel of the background depth image supplied from the screen multiplexing unit 77, to the value representing the right/left specifying information with respect to the predetermined value. The chroma component converting unit 78 functions as the transmitting unit, and transmits the changed background depth image to the inverse format conversion device 52 via the multi-view image encoding device 12 and the multi-view image decoding device 13.

The reference-point depth image and the reference-point color image that are input to the format conversion device 51 are supplied to the multi-view image encoding device 12 without any change.

[Description of a Depth Image Warping Operation]

Figure 8:
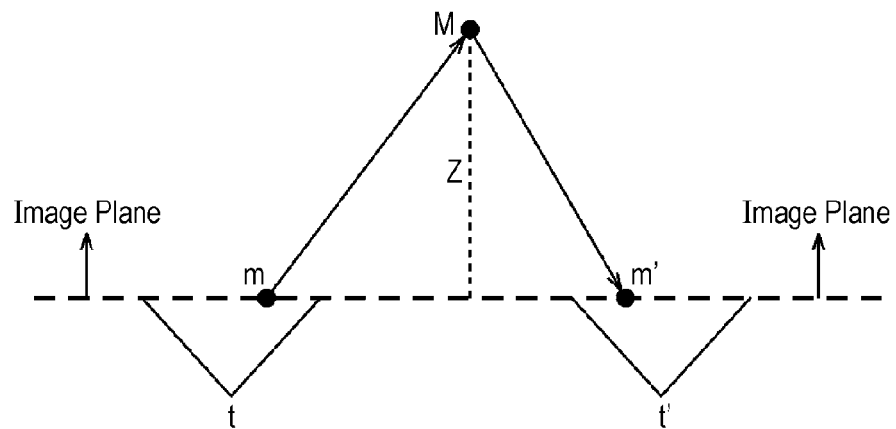
FIG. 8 is a diagram for explaining a depth image warping operation.

FIG. 8 is a diagram for explaining a depth image warping operation.

In a depth image warping operation, the position m (x, y, z) of each pixel of a depth image of a viewpoint that is to be processed and is located in a position t ($t_x$, $t_y$, $t_z$) is first associated, via a three-dimensional space, with the position m' (x', y', z') of a depth image of a viewpoint that is located in a position t' ($t'_x$, $t'_y$, $t'_z$) and has been subjected to a warping operation, as shown in FIG. 8.

Specifically, according to the equations (1) shown below, the position M (X, Y, Z) corresponding to the position m (x, y, z) of a pixel with a depth value Z in the depth image of the viewpoint in the position t ($t_x$, $t_y$, $t_z$) in the three-dimensional space is determined, and the position m' (x', y', z') corresponding to the position M (X, Y, Z) in the warped depth image of the viewpoint in the position t' ($t'_x$, $t'_y$, $t'_z$) is determined.

$$(X,Y,Z)^T = RA^{-1}(x,y,1)^T Z + (t_x, t_y, t_z)^T$$

$$s(x',y',1)^T = A'R'^{-1}[(X,Y,Z)^T - (t'_x, t'_y, t'_z)^T] \quad (1)$$

In the equations (1), R represents the rotation matrix for warping operations of the cameras that capture depth images, and is expressed by the following equation (2):

[Mathematical Formula 1]  (2)

$$R = \begin{bmatrix} r\_11 & r\_12 & r\_13 \\ r\_21 & r\_22 & r\_23 \\ r\_31 & r\_32 & r\_33 \end{bmatrix}$$

In the equation (2), r_11 through r_13, r_21 through r_23, and r_31 through r_33 are predetermined values.

In the equations (1), A represents a matrix containing the internal parameters of the cameras (not shown) that capture depth images, and is expressed by the following equation (3):

[Mathematical Formula 2]  (3)

$$A = \begin{bmatrix} focal\_length\_x & radial\_distortion & principal\_point\_x \\ 0.0 & focal\_length\_y & principal\_point\_y \\ 0.0 & 0.0 & 1.0 \end{bmatrix}$$

In the equation (3), "focal_length_x" and "focal_length_y" represent the x-direction focal length and the y-direction focal length in the internal parameters, respectively. "principal_point_x" and "principal_point_y" represent the x-direction position and the y-direction position of the principal point in the internal parameters, respectively. "radial_distortion" represents the radial distortion coefficient in the internal parameters.

Further, in the equations (1), R' is expressed in the same manner as R, and represents the rotation matrix for warping operations of a virtual camera that captures depth images subjected to warping operations. A' is expressed in the same manner as A, and represents a matrix containing the internal parameters of a virtual camera that captures depth images subjected to warping operations. Also, in the equations (1), s represents scaling factor.

After the associating is performed in the above manner, the pixels in a warped depth image that correspond to the respective pixels in the depth image to be processed are determined based on the position m' (x', y', z') corresponding to the position m (x, y, z) of each pixel. The depth values of the respective pixels in the depth image to be processed are then set as the depth values of the pixels in the warped depth image that correspond to the respective pixels.

[Description of Generation of the Left Depth Occlusion Image]

Figure 9:
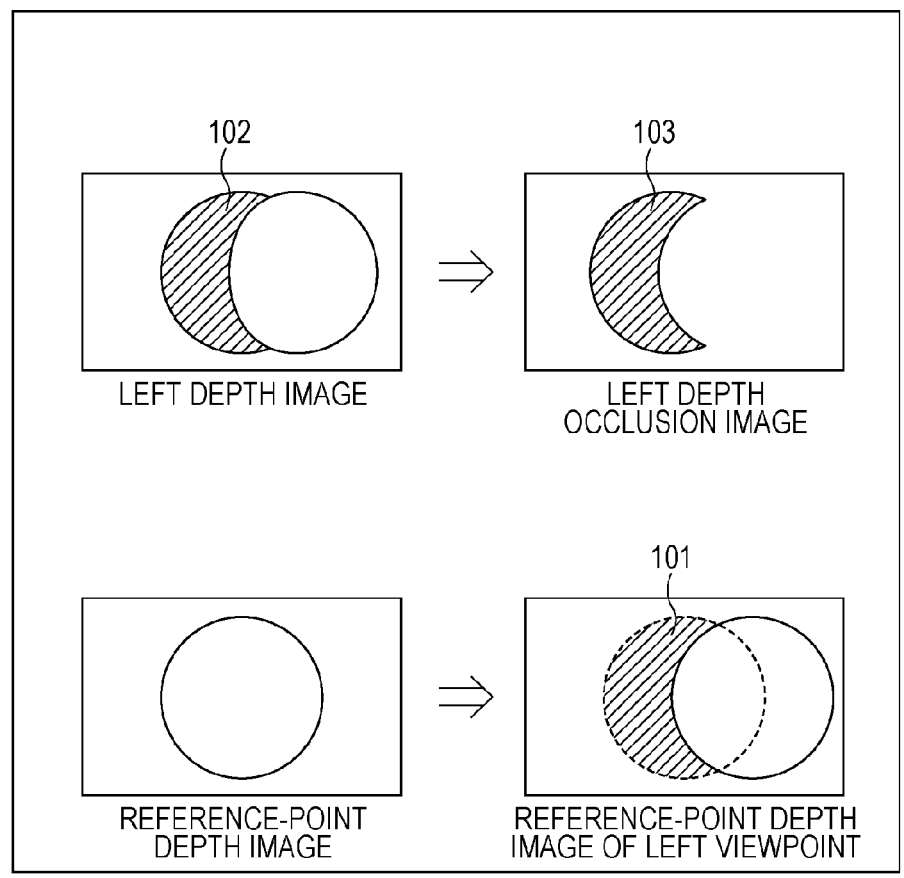
FIG. 9 is a diagram for explaining generation of a left depth occlusion image.

FIG. 9 is a diagram for explaining the generation of the left depth occlusion image by the format conversion device 51 shown in FIG. 7.

In the example shown in FIG. 9, the reference-point depth image is a depth image that is obtained when an image of a spherical object located as the foreground at the center of a predetermined background is captured.

As shown in FIG. 9, when a foreground-prioritized warping operation toward the left viewpoint is performed on the reference-point depth image by the warping unit 71, the reference-point depth image of the left viewpoint is generated. The region where depth values do not exist in the reference-point depth image of the left viewpoint is detected as a left-viewpoint occlusion region 101 by the occlusion determining unit 72. When there are peripheral pixels in the left-viewpoint occlusion region, and there exist pixels having depth values, the pixels are also included in the left-viewpoint occlusion region 101.

A background-prioritized warping operation toward the reference point is then performed on the region 102 corresponding to the left-viewpoint occlusion region 101 in the left depth image by the warping unit 73. As a result, the background of the region 102 in the left depth image is transformed into an image of a region 103 corresponding to the region 102 in the reference-point depth image, and is set as the left depth occlusion image.

In the example shown in FIG. 9, the precision of the reference-point image is low, and the left-viewpoint occlusion region 101 that appears in the reference-point depth image of the left viewpoint is larger than the actual left-viewpoint occlusion region. Accordingly, the region 102 in the left depth image includes a circular region other than 0 in depth value, but all the depth values in the region 102 are changed to 0 at the time of the warping operation. That is, the depth values of the foreground pixels in the region 102 are changed to the background depth values at the time of the warping operation.

[Example Layout of the Right/Left Specifying Information]

Figure 10:
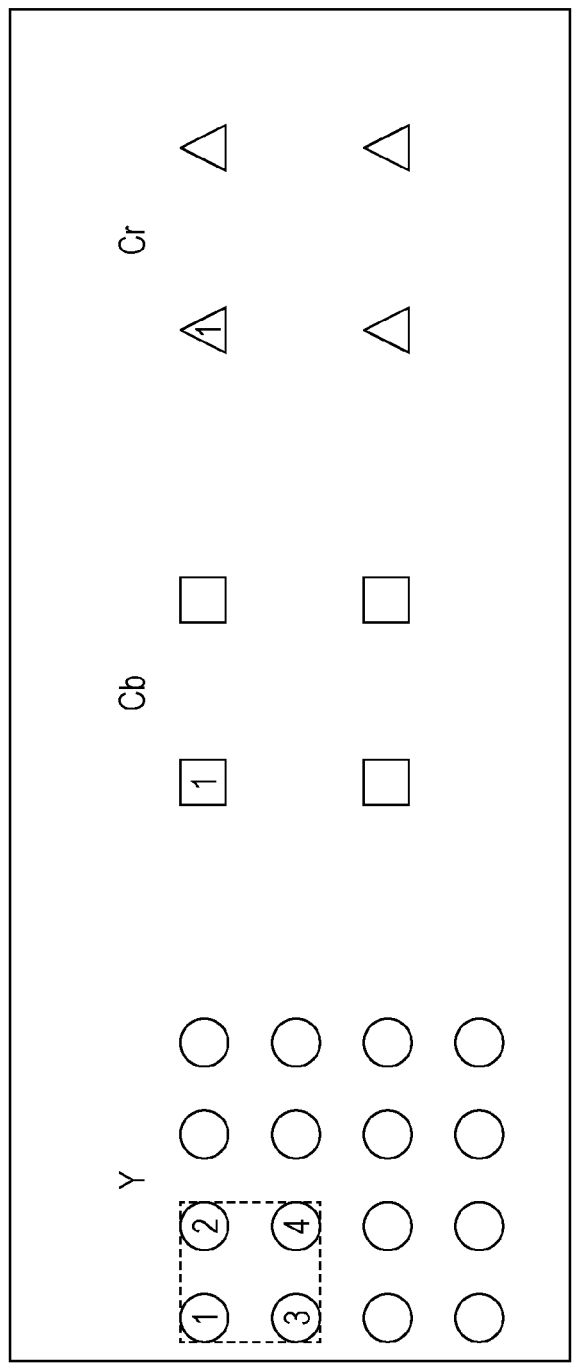
FIG. 10 is a diagram showing the pixels corresponding to the values of the respective components of a background depth image.

FIG. 10 is a diagram showing the pixels corresponding to the values of the respective components of a background depth image.

In the example shown in FIG. 10, the background depth image is an image formed with 4×4 pixels of so-called YCbCr420. In FIG. 10, circles, squares, and triangles represent the pixels corresponding to the luminance component (the Y component), the Cb component of the chroma component, and the Cr component of the chroma component, respectively.

As shown in FIG. 10, the Y component of the background depth image has a value for each pixel, and the Cb component and the Cr component have a value for each 2×2 pixels.

Figure 11:
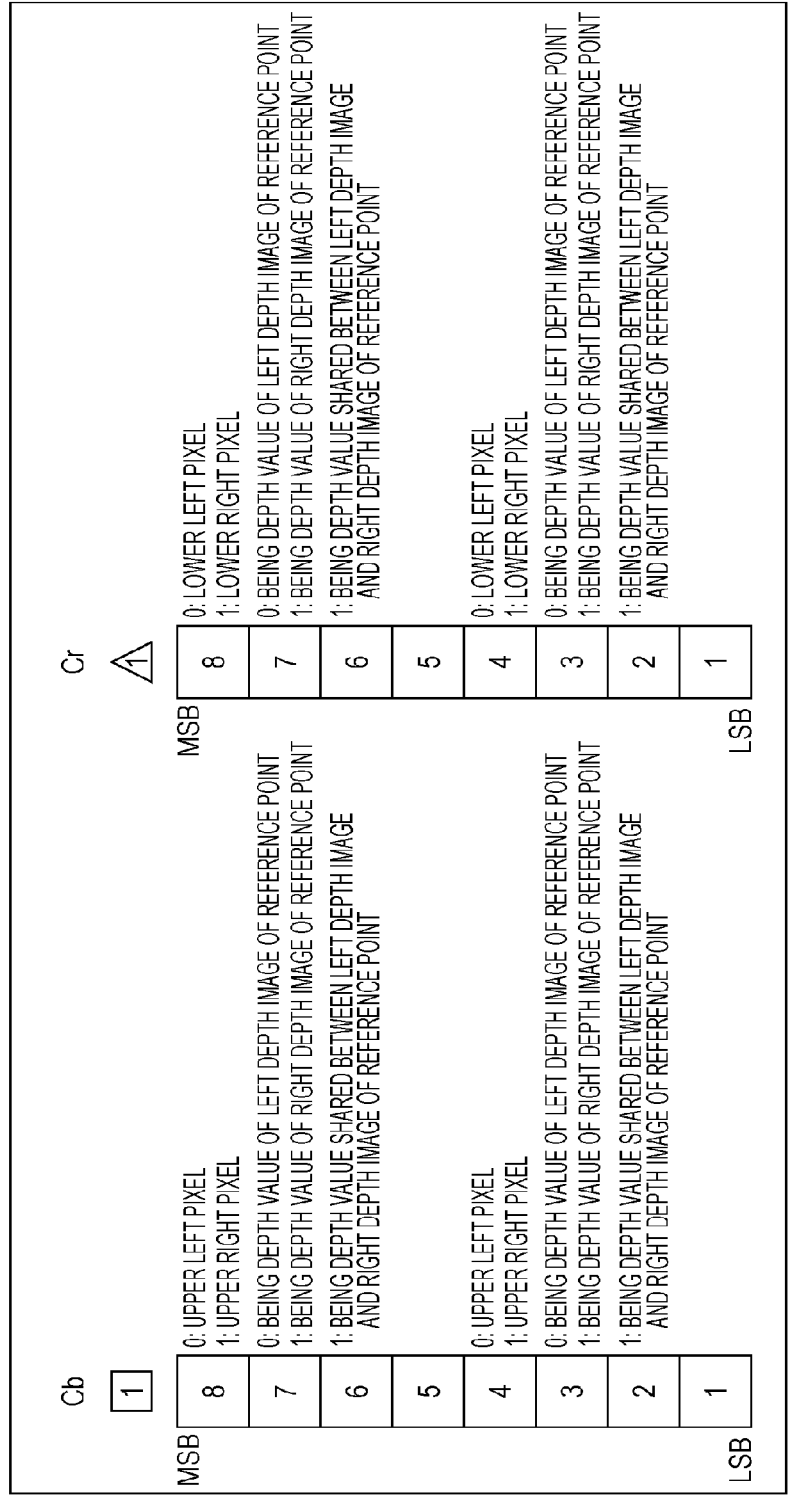
FIG. 11 is a diagram showing an example of bit strings of the values of a Cb component and a Cr component.

FIG. 11 is a diagram showing an example of bit strings of values of the Cb component and the Cr component.

In the example shown in FIG. 11, the number of bits of each value of the Cb component and the Cr component is 8.

In this case, as shown in FIG. 11, the value of the eighth bit, which is the MSB (Most Significant Bit) of the values of the eight bits of the Cb component represents one of the two upper two pixels of the 2×2 pixels corresponding to the value of the Cb component. Specifically, the value of the eighth bit is 0 when representing the upper left pixel (the pixel indicated by the circle with "1" in FIG. 10, for example), and is 1 when representing the upper right pixel (the pixel indicated by the circle with "2" in FIG. 10, for example).

The values of the seventh bit and the sixth bit of the Cb component represent the right/left specifying information about the pixel represented by the value of the eighth bit. Specifically, when the right/left specifying information about the pixel represented by the eighth bit indicates that the depth value (or the pixel value) of each pixel in the background depth image (or the background color image) is the depth value of the left depth image (or the left color image) of the reference point, the value of the seventh bit is 0. Such a case will be hereinafter referred to as the case where the right/left specifying information indicates "left".

When the right/left specifying information about the pixel represented by the eighth bit indicates that the depth value (or the pixel value) of each pixel in the background depth image (or the background color image) is the depth value of the right depth image (or the right color image) of the reference point, the value of the seventh bit is 1. Such a case will be hereinafter referred to as the case where the right/left specifying information indicates "right".

Further, when the right/left specifying information about the pixel represented by the eighth bit indicates that the depth value (or the pixel value) of each pixel in the background depth image (or the background color image) is the depth value (or the pixel value) that is common between the left depth image (or the left color image) of the reference point and the right depth image (or a right color image) of the reference point, the value of the sixth bit is 1. Such a case will be hereinafter referred to as the case where the right/left specifying information indicates "right and left". The fifth bit of the Cb component is a free space.

Like the values of the sixth through eighth bits, the values of the second through fourth bits of the Cb component represent the information about the pixel not represented by the eighth bit between the upper two pixels of the 2×2 pixels corresponding to the value of the Cb component. The first bit, which is the LSB (Least Significant Bit), is a free space.

Like the eight bits of the Cb component, the eight bits of the Cr component represent the information about the lower two pixels (the pixels indicated by the circles with "3" and "4" in FIG. 10, for example) among the 2×2 pixels corresponding to the value of the Cb component.

[Description of a First Example Operation of the Format Conversion Device]

Figure 12:
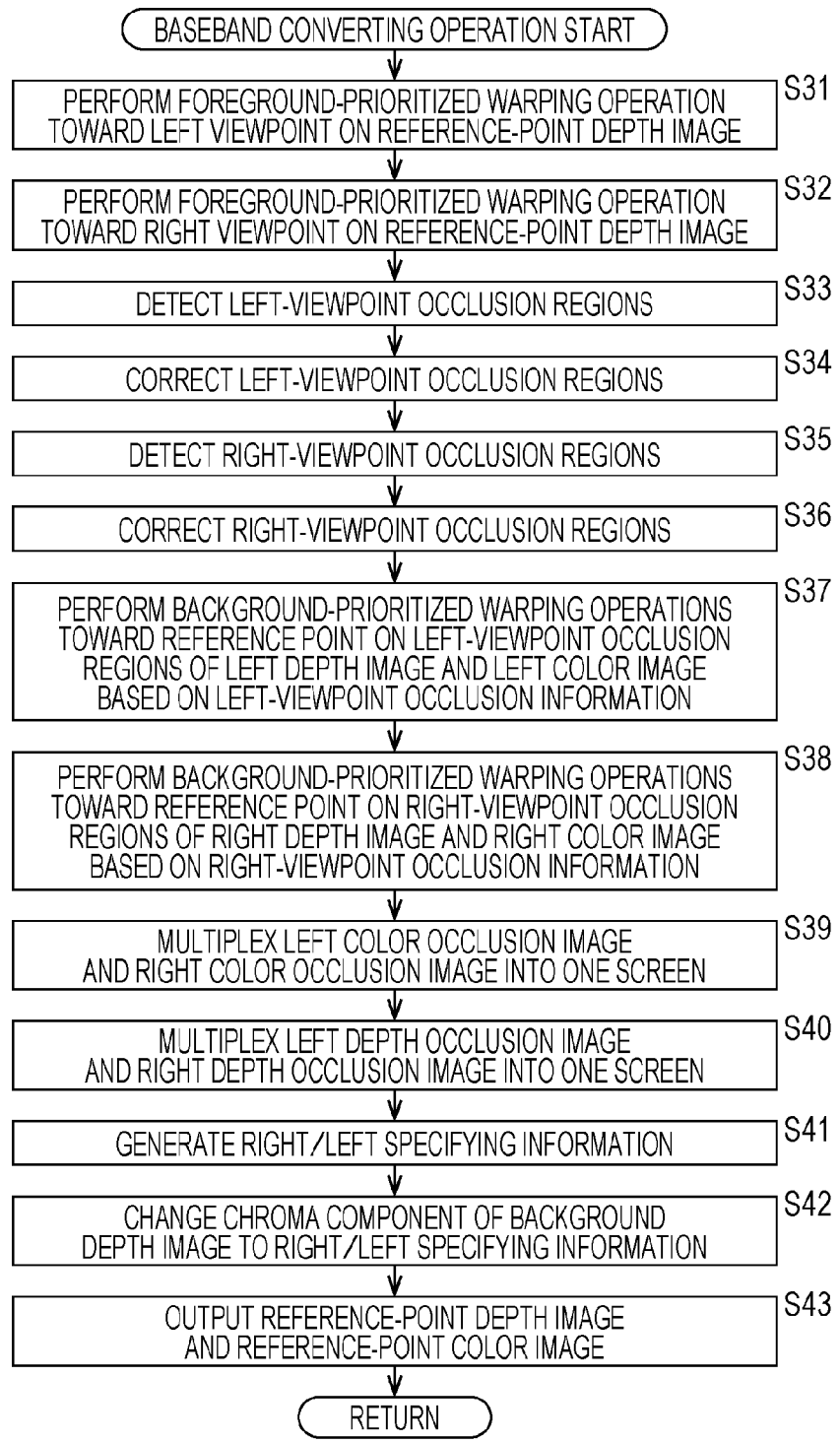
FIG. 12 is a flowchart for explaining in detail a baseband converting operation to be performed by the format conversion device shown in FIG. 7.

FIG. 12 is a flowchart for explaining in detail the baseband converting operation of step S13 of FIG. 6, which is performed by the format conversion device 51 shown in FIG. 7.

In step S31 of FIG. 12, the warping unit 71 of the format conversion device 51 performs a foreground-prioritized warping operation toward the left viewpoint on an input reference-point depth image, and supplies the resultant reference-point depth image of the left viewpoint to the occlusion determining unit 72.

In step S32, the warping unit 74 performs a foreground-prioritized warping operation toward the right viewpoint on the input reference-point depth image, and supplies the resultant reference-point depth image of the right viewpoint to the occlusion determining unit 75.

In step S33, the occlusion determining unit 72 detects the left-viewpoint occlusion region formed with the pixels that have no depth values in the reference-point depth image of the left viewpoint supplied from the warping unit 71.

In step S34, the occlusion determining unit 72 corrects the left-viewpoint occlusion region by adding the pixels that have peripheral pixels in the left-viewpoint occlusion region and have depth values in the reference-point depth image of the left viewpoint, to the left-viewpoint occlusion region. The occlusion determining unit 72 then supplies the left-viewpoint occlusion information for identifying the corrected left-viewpoint occlusion region to the warping unit 73.

In step S35, the occlusion determining unit 75 detects the right-viewpoint occlusion region formed with the pixels that have no depth values in the reference-point depth image of the right viewpoint supplied from the warping unit 74.

In step S36, the occlusion determining unit 75 corrects the right-viewpoint occlusion region by adding the pixels that have peripheral pixels in the right-viewpoint occlusion region and have depth values in the reference-point depth image of the right viewpoint, to the right-viewpoint occlusion region. The occlusion determining unit 75 then supplies the right-viewpoint occlusion information for identifying the corrected right-viewpoint occlusion region to the warping unit 76.

In step S37, based on the left-viewpoint occlusion information supplied from the occlusion determining unit 72, the warping unit 73 performs background-prioritized warping operations toward the reference point on the left-viewpoint occlusion regions of the left depth image and the left color image that are input thereto. The warping unit 73 then supplies the left depth occlusion image and the left color occlusion image obtained as a result of the warping operations, to the screen multiplexing unit 77.

In step S38, based on the right-viewpoint occlusion information supplied from the occlusion determining unit 75, the warping unit 76 performs background-prioritized warping operations toward the reference point on the right-viewpoint occlusion regions of the right depth image and the right color image that are input thereto. The warping unit 76 then supplies the right depth occlusion image and the right color occlusion image obtained as a result of the warping operations, to the screen multiplexing unit 77.

In step S39, the screen multiplexing unit 77 multiplexes the left color occlusion image supplied from the warping unit 73 and the right color occlusion image supplied from the warping unit 76 into one screen, and supplies the screen to the multi-view image encoding device 12 shown in FIG. 5.

In step S40, the screen multiplexing unit 77 multiplexes the left depth occlusion image supplied from the warping unit 73 and the right depth occlusion image supplied from the warping unit 76 into one screen. The screen multiplexing unit 77 then supplies the resultant background depth image to the chroma component converting unit 78, the background depth image having the depth value of each pixel as a luminance component and a predetermined value as a chroma component.

In step S41, the screen multiplexing unit 77 generates the right/left specifying information for each pixel, and supplies the right/left specifying information to the chroma component converting unit 78.

In step S42, the chroma component converting unit 78 changes the chroma component of each pixel of the background depth image supplied from the screen multiplexing unit 77, to the value representing the right/left specifying information with respect to the predetermined value, and supplies the changed background depth image to the multi-view image encoding device 12.

In step S43, the output unit 26 outputs the input reference-point depth image and reference-point color image to the multi-view image encoding device 12 without any change. The baseband converting operation then comes to an end.

As described above, the format conversion device 51 shown in FIG. 7 detects the left-viewpoint occlusion region and the right-viewpoint occlusion region by using the reference-point depth images of the left viewpoint and the right viewpoint. Accordingly, the format conversion device 51 can accurately detect the left-viewpoint occlusion region and the right-viewpoint occlusion region that appear at the inverse format conversion device 52 even when the precision of the reference-point depth image is low.

As a result, the inverse format conversion device 52 can prevent the left color image, the left depth image, the right color image, and the right depth image from breaking, by interpolating the left-viewpoint occlusion region and the right-viewpoint occlusion region with the background color image and the background depth image, even when the precision of the reference-point depth image is low.

[First Specific Example Structure of the Inverse Format Conversion Device]

Figure 13:
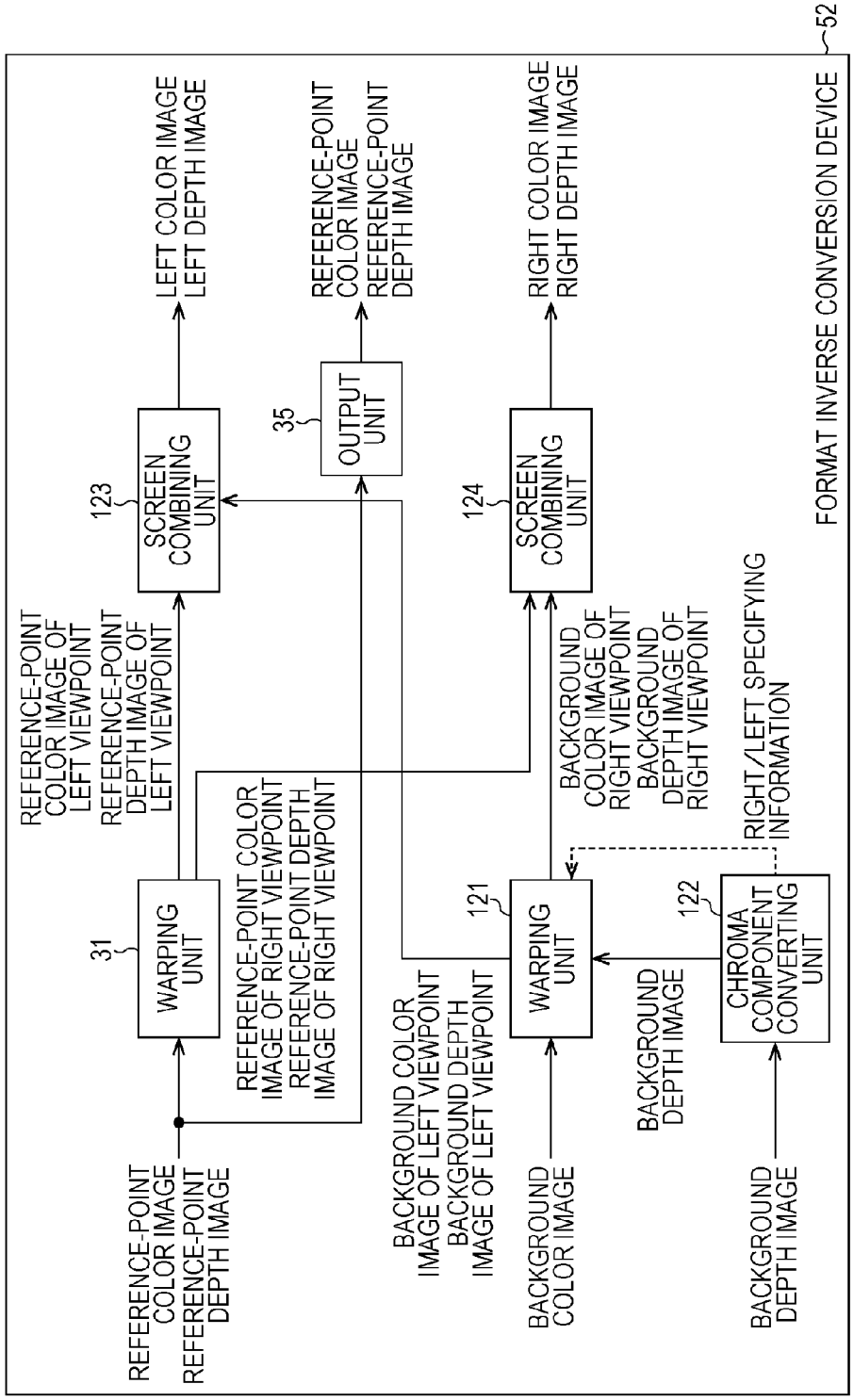
FIG. 13 is a block diagram showing a first specific example structure of the inverse format conversion device shown in FIG. 5.

FIG. 13 is a block diagram showing a first specific example structure of the inverse format conversion device 52 shown in FIG. 5.

Figure 3:
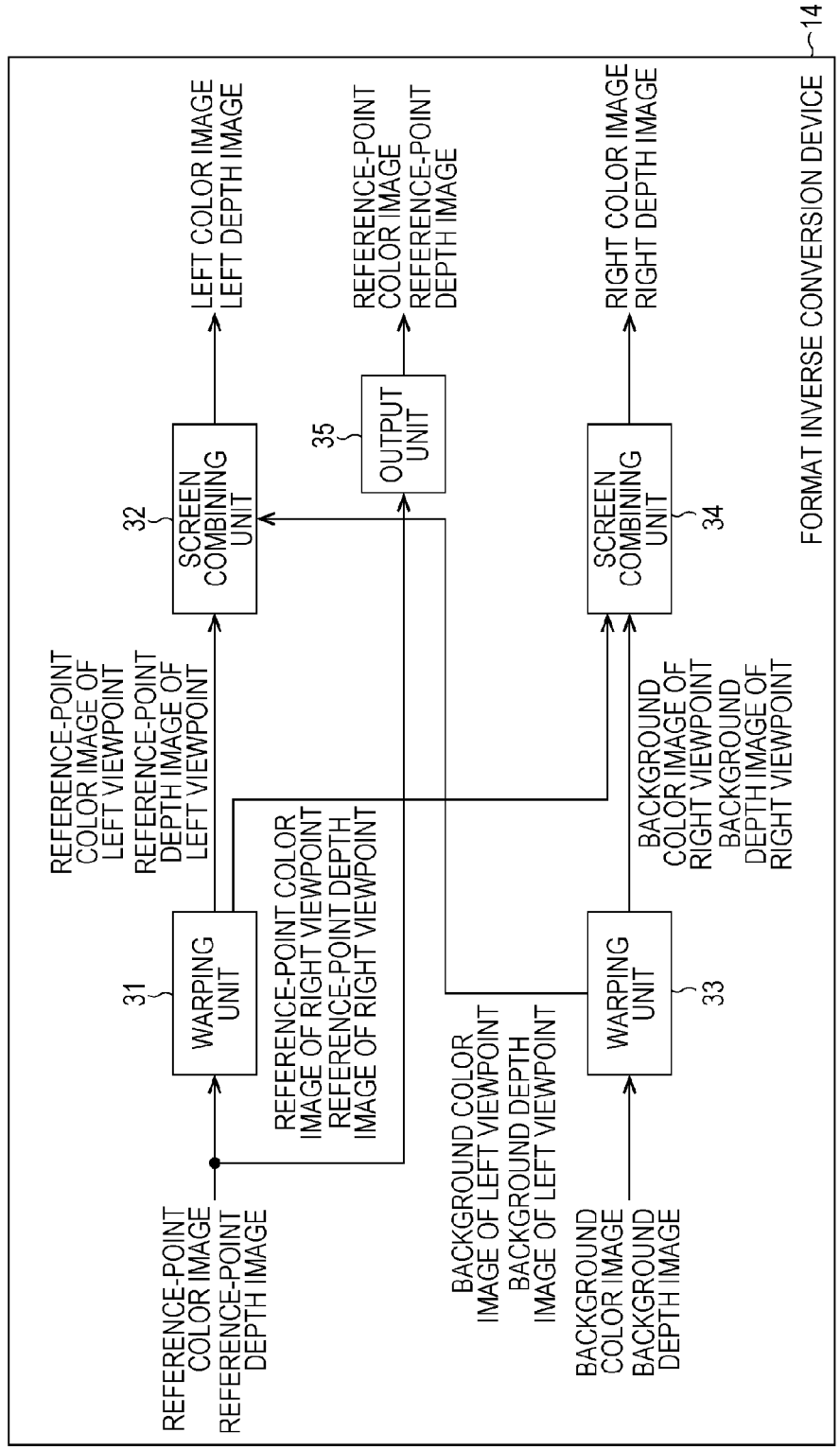
FIG. 3 is a block diagram showing an example structure of the inverse format conversion device shown in FIG. 1.
Figure 4:
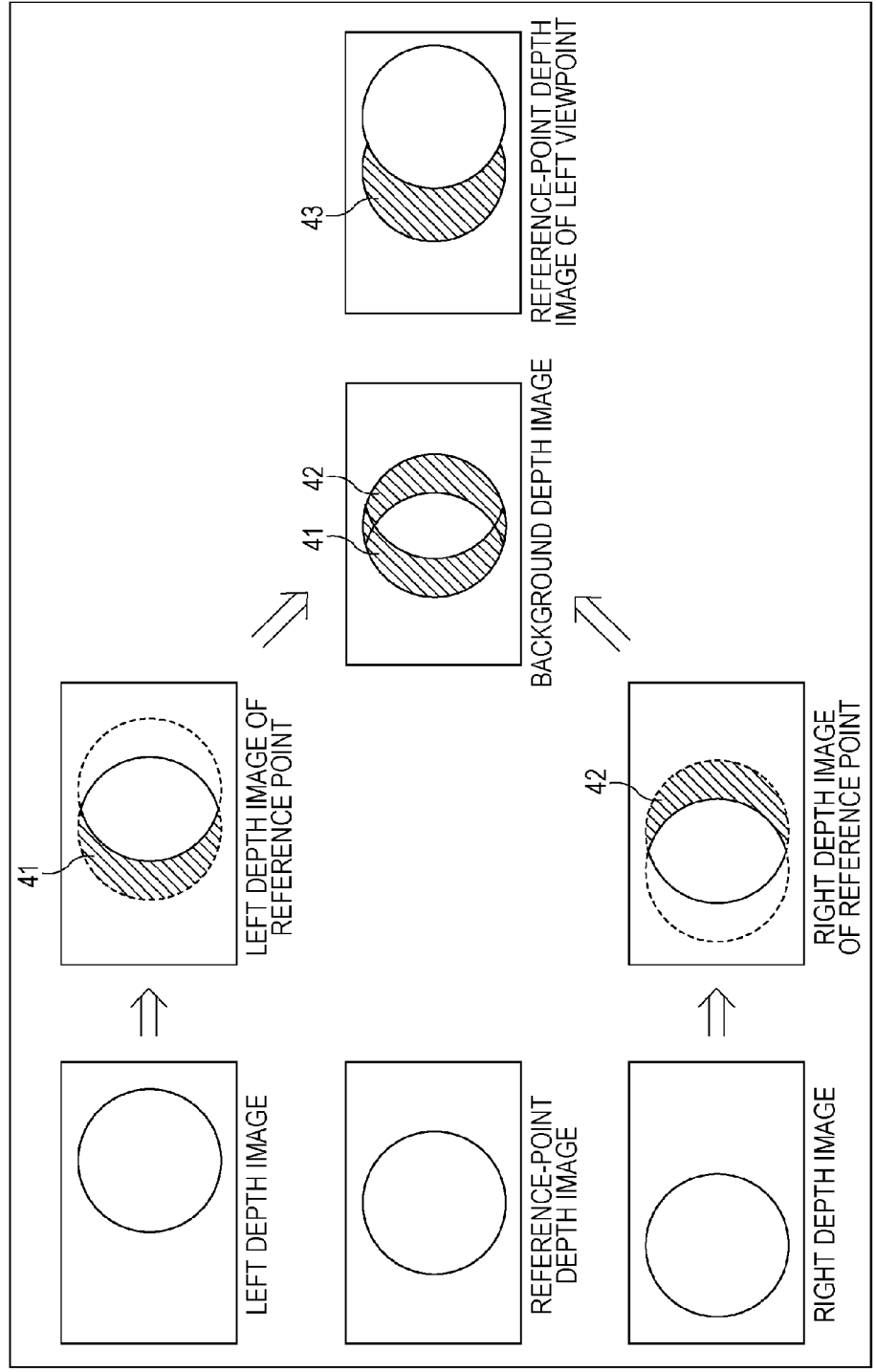
FIG. 4 is a diagram for explaining an image that is restored when the precision of the reference-point depth image is low.

In the structure illustrated in FIG. 13, the same components as those in FIG. 3 are denoted by the same reference numerals as those in FIG. 3. The explanations that have already been made will not be repeated.

The structure of the inverse format conversion device 52 shown in FIG. 13 differs from the structure shown in FIG. 3, mainly in that the screen combining unit 32, the warping unit 33, and the screen combining unit 34 are replaced with a screen combining unit 123, a warping unit 121, and a screen combining unit 124, and a chroma component converting unit 122 is newly provided.

The warping unit 121 of the inverse format conversion device 52 functions as the receiving unit, and receives the background color image supplied from the multi-view image decoding device 13. The warping unit 121 performs, on each pixel of the background color image, a foreground-prioritized warping operation toward the left viewpoint or the right viewpoint in accordance with the right/left specifying information about the pixel, the right/left specifying information being supplied from the chroma component converting unit 122.

Specifically, when the right/left specifying information about a certain pixel is 0, which represents "left", the warping unit 121 performs a foreground-prioritized warping operation toward the left viewpoint on the pixel. When the right/left specifying information about a certain pixel is 1, which represents "right", the warping unit 121 performs a foreground-prioritized warping operation toward the right viewpoint on the pixel. Further, when the right/left specifying information about a certain pixel is 2, which represents "right and left", the warping unit 121 performs foreground-prioritized warping operations toward the left viewpoint and the right viewpoint on the pixel.

The warping unit 121 also performs, on each pixel of the background depth image supplied from the chroma component converting unit 122, a foreground-prioritized warping operation toward the left viewpoint or the right viewpoint in accordance with the right/left specifying information about the pixel, as in the case of the background color image.

As described above, the foreground-prioritized warping operations toward the viewpoint corresponding to the right/left specifying information are performed, to generate left-viewpoint images formed only with the left-viewpoint occlusion regions of the background color image and the background depth image, and right-viewpoint images formed only with the right-viewpoint occlusion regions.

The warping unit 121 sets the left-viewpoint image formed only with the left-viewpoint occlusion region of the background color image as the background color image of the left viewpoint, and sets the left-viewpoint image formed only with the left-viewpoint occlusion region of the background depth image as the background depth image of the left viewpoint. The background color image of the left viewpoint and the background depth image of the left viewpoint are then supplied to the screen combining unit 123. The warping unit 121 also sets the right-viewpoint image formed only with the right-viewpoint occlusion region of the background color image as the background color image of the right viewpoint, and sets the right-viewpoint image formed only with the right-viewpoint occlusion region of the background depth image as the background depth image of the right viewpoint. The background color image of the right viewpoint and the background depth image of the right viewpoint are then supplied to the screen combining unit 123.

The chroma component converting unit 122 functions as the receiving unit, and receives the background depth image supplied from the multi-view image decoding device 13. The chroma component converting unit 122 generates the right/left specifying information from the chroma component of the background depth image.

Specifically, when the third or seventh bit of the chroma component of the background depth image is 0, the chroma component converting unit 122 generates 0 as the right/left specifying information about the pixel represented by the fourth or eighth bit. When the third or seventh bit of the chroma component of the background depth image is 1, the chroma component converting unit 122 generates 1 as the right/left specifying information about the pixel represented by the fourth or eighth bit. Further, when the second or sixth bit of the chroma component of the background depth image is 1, the chroma component converting unit 122 generates 2 as the right/left specifying information about the pixel represented by the fourth or eighth bit.

The chroma component converting unit 122 also changes the chroma component of the background depth image from the value representing the right/left specifying information to a predetermined value, and then supplies the changed chroma component to the warping unit 121.

The screen combining unit 123 functions as the first combining unit. The screen combining unit 123 combines the reference-point color image of the left viewpoint generated by the warping unit 31 with the background color image of the left viewpoint supplied from the warping unit 121, and outputs the resultant image as the left color image. The screen combining unit 123 also combines the reference-point depth image of the left viewpoint generated by the warping unit 31 with the background depth image of the left viewpoint supplied from the warping unit 121, and outputs the resultant image as the left depth image.

The screen combining unit 124 functions as the second combining unit. The screen combining unit 124 combines the reference-point color image of the right viewpoint generated by the warping unit 31 with the background color image of the right viewpoint supplied from the warping unit 121, and outputs the resultant image as the right color image. The screen combining unit 124 combines the reference-point depth image of the right viewpoint generated by the warping unit 31 with the background depth image of the right viewpoint supplied from the warping unit 121, and outputs the resultant image as the right depth image.

When there are pixel values in both the reference-point color image and the background color image at the time of the combining performed by the screen combining unit 123 and the screen combining unit 124, the pixel value of the background color image is selected as the pixel value after the combining. Likewise, when there are pixel values in both the reference-point depth image and the background depth image, the pixel value of the background depth image is selected as the pixel value after the combining. When there is a pixel value in one of the reference-point color image and the background color image, the pixel value is set as the pixel value after the combining.

As described above, the screen combining unit 123 and the screen combining unit 124 preferentially select the background color image and the background depth image at the time of the combining, instead of the background color images and the background depth images of the left viewpoint and the right viewpoint. Therefore, when the left-viewpoint occlusion region and the right-viewpoint occlusion region are corrected at the format conversion device 51, the corrected left-viewpoint occlusion region and right-viewpoint occlusion region are interpolated with the background color image and the background depth image. Accordingly, the image quality of the left color image, the left depth image, the right color image, and the right depth image, which are obtained as a result of the combining, can be increased.

As described above, the background color image and the background depth image of the left viewpoint are generated only from the left-viewpoint occlusion regions of the background color image and the background depth image. Therefore, even when the background color image and the background depth image of the left viewpoint are preferentially selected at the time of combining, an image of a right-viewpoint occlusion region does not exist in the left color image and the left depth image. Likewise, an image of a left-viewpoint occlusion region does not exist in the right color image and the right depth image.

[Description of a First Example Operation of the Inverse Format Conversion Device]

Figure 14:
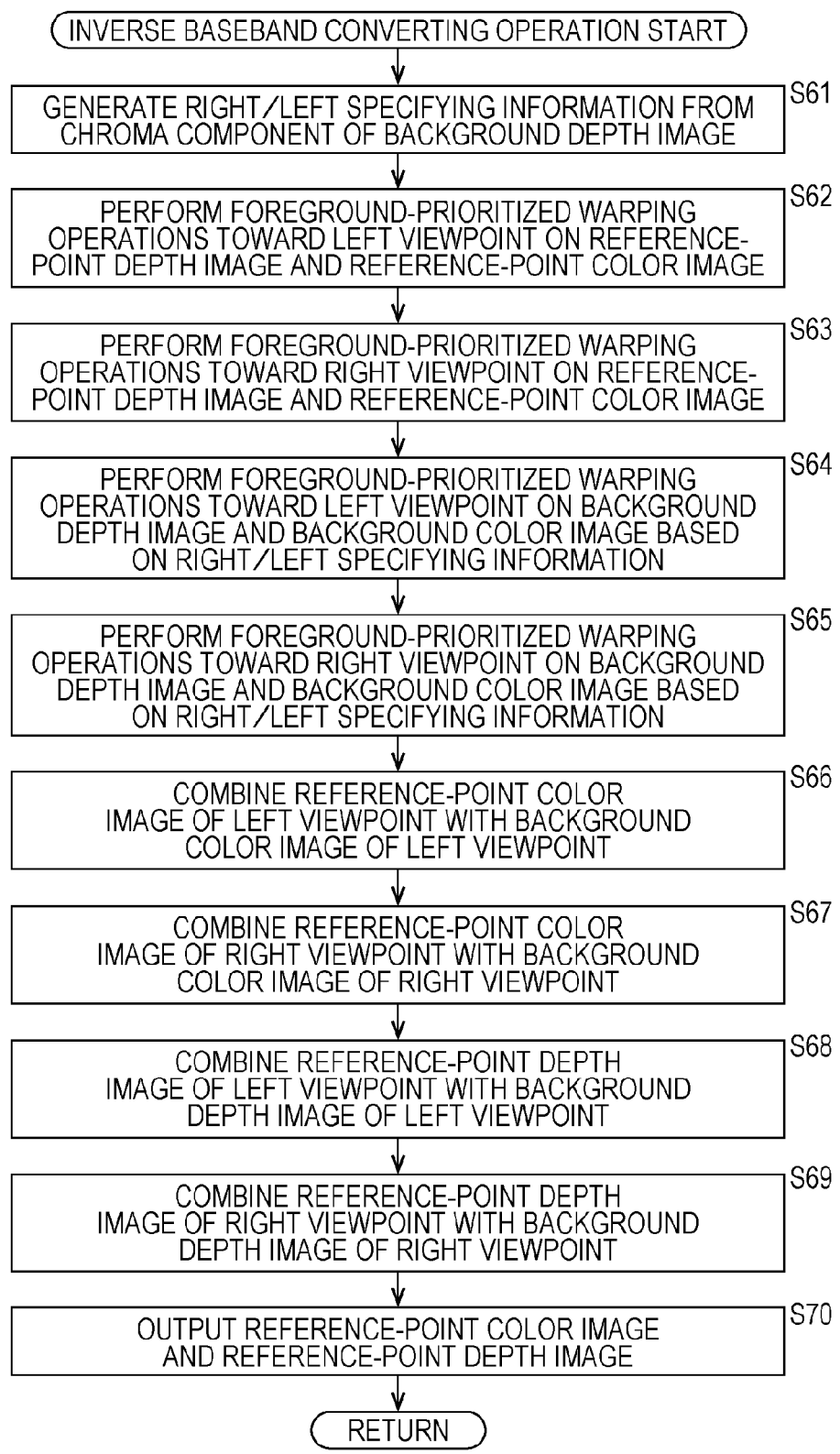
FIG. 14 is a flowchart for explaining in detail an inverse baseband converting operation to be performed by the inverse format conversion device shown in FIG. 13.

FIG. 14 is a flowchart for explaining in detail the inverse baseband converting operation of step S16 of FIG. 6, which is performed by the inverse format conversion device 52 shown in FIG. 13.

In step S61 of FIG. 14, the chroma component converting unit 122 of the inverse format conversion device 52 receives the background depth image from the multi-view image decoding device 13, and generates the right/left specifying information from the chroma component of the background depth image. The chroma component converting unit 122 also changes the chroma component of the background depth image from the value representing the right/left specifying information to a predetermined value, and then supplies the changed chroma component to the warping unit 121.

In step S62, the warping unit 31 performs foreground-prioritized warping operations toward the left viewpoint on the reference-point depth image and the reference-point color image supplied from the multi-view image decoding device 13. The warping unit 31 then supplies the resultant reference-point depth image and reference-point color image of the left viewpoint to the screen combining unit 123.

In step S63, the warping unit 31 performs foreground-prioritized warping operations toward the right viewpoint on the reference-point depth image and the reference-point color image supplied from the multi-view image decoding device 13. The warping unit 31 then supplies the resultant reference-point depth image and reference-point color image of the right viewpoint to the screen combining unit 124.

In step S64, based on the right/left specifying information, the warping unit 121 performs a foreground-prioritized warping operation toward the left viewpoint, on each pixel having the right/left specifying information representing "left" or "right and left" in the background depth image and the background color image. The warping unit 121 then supplies the resultant background depth image and background color image of the left viewpoint to the screen combining unit 123.

In step S65, based on the right/left specifying information, the warping unit 121 performs a foreground-prioritized warping operation toward the right viewpoint, on each pixel having the right/left specifying information representing "right" or "right and left" in the background depth image and the background color image. The warping unit 121 then supplies the resultant background depth image and background color image of the right viewpoint to the screen combining unit 124.

In step S66, the screen combining unit 123 combines the reference-point color image of the left viewpoint generated by the warping unit 31 with the background color image of the left viewpoint supplied from the warping unit 121, and outputs the resultant left color image.

In step S67, the screen combining unit 124 combines the reference-point color image of the right viewpoint generated by the warping unit 31 with the background color image of the right viewpoint supplied from the warping unit 121, and outputs the resultant right color image.

In step S68, the screen combining unit 123 combines the reference-point depth image of the left viewpoint generated by the warping unit 31 with the background depth image of the left viewpoint supplied from the warping unit 121, and outputs the resultant left depth image.

In step S69, the screen combining unit 124 combines the reference-point depth image of the right viewpoint generated by the warping unit 31 with the background depth image of the right viewpoint supplied from the warping unit 121, and outputs the resultant right depth image.

In step S70, the output unit 35 outputs the reference-point color image and the reference-point depth image supplied from multi-view image decoding device 13. The inverse baseband converting operation then comes to an end.

As described above, the background color image and the background depth image of the left-viewpoint occlusion region and the right-viewpoint occlusion region detected by using the reference-point depth images of the left viewpoint and the right viewpoint are supplied to the inverse format conversion device 52 from the format conversion device 51. Accordingly, the inverse format conversion device 52 can prevent the left color image, the left depth image, the right color image, and the right depth image from breaking, by interpolating the left-viewpoint occlusion region and the right-viewpoint occlusion region with the background color image and the background depth image, even when the precision of the reference-point depth image is low.

[Second Example Structure of the Format Conversion Device]

Figure 15:
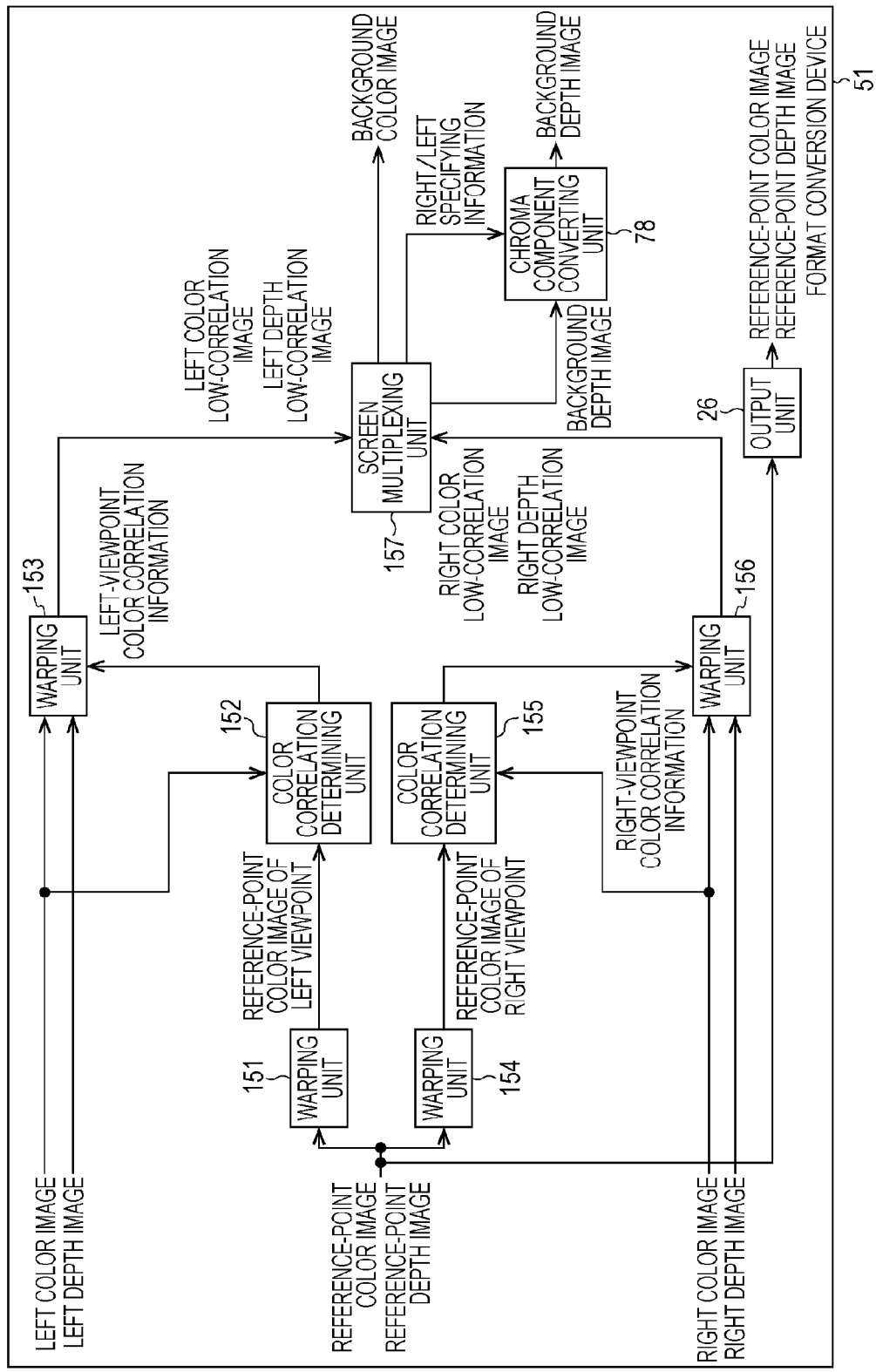
FIG. 15 is a block diagram showing a second specific example structure of the format conversion device shown in FIG. 5.

FIG. 15 is a block diagram showing a second specific example structure of the format conversion device 51 shown in FIG. 5.

In the structure illustrated in FIG. 15, the same components as those in FIG. 7 are denoted by the same reference numerals as those in FIG. 7. The explanations that have already been made will not be repeated.

The structure of the format conversion device 51 shown in FIG. 15 differs from the structure shown in FIG. 7, mainly in that the warping unit 71, the warping unit 73, the warping unit 74, the warping unit 76, and the screen multiplexing unit 77 are replaced with a warping unit 151, a warping unit 153, a warping unit 154, a warping unit 156, and a screen multiplexing unit 157, and color correlation determining units 152 and 155 are newly provided.

The format conversion device 51 shown in FIG. 15 generates a background color image by multiplexing a left color image of a region including a left-viewpoint occlusion region and a right color image of a region including a right-viewpoint occlusion region into one screen. The format conversion device 51 shown in FIG. 15 also generates a background depth image by multiplexing a left depth image of a region including a left-viewpoint occlusion region and a right depth image of a region including a right-viewpoint occlusion region into one screen.

Specifically, the warping unit 151 of the format conversion device 51 shown in FIG. 15 performs a foreground-prioritized warping operation toward the left viewpoint on an input reference-point depth image, to generate the reference-point depth image of the left viewpoint. The warping unit 151 functions as the non-reference viewpoint warping unit, and performs a foreground-prioritized warping operation toward the left viewpoint on an input color image by using the reference-point depth image of the left viewpoint, to generate the reference-point color image of the left viewpoint. At this point, the left-viewpoint occlusion region in the reference-point color image of the left viewpoint may be a black image, for example. The warping unit 151 supplies the generated reference-point color image of the left viewpoint to the color correlation determining unit 152.

The color correlation determining unit 152 functions as the detecting unit, and determines, for each pixel, the difference between an input left color image and the reference-point color image of the left viewpoint supplied from the warping unit 151. Based on the determined difference, the color correlation determining unit 152 generates, for each pixel, color correlation information that indicates a high correlation or a low correlation.

Specifically, when the determined difference is equal to or larger than a predetermined threshold value, the color correlation determining unit 152 detects the pixel as a low-correlation region, and generates information that indicates a low correlation as the color correlation information. Accordingly, the color correlation information corresponding to the left-viewpoint occlusion region is information that indicates a low correlation, for example. When the determined difference is smaller than the predetermined threshold value, on the other hand, the color correlation determining unit 152 generates information that indicates a high correlation as the color correlation information. The color correlation determining unit 152 then supplies the generated color correlation information as the left-viewpoint color correlation information to the warping unit 153.

Based on the left-viewpoint color correlation information supplied from the color correlation determining unit 152, the warping unit 153 detects regions formed with the pixels corresponding to the color correlation information indicating a low correlation (hereinafter referred to as the low-correlation regions) from the left depth image and the left color image. That is, the warping unit 153 detects the low-correlation regions including the left-viewpoint occlusion regions that appear in the reference-point color image and the reference-point depth image of the left viewpoint, from the left depth image and the left color image.

The warping unit 153 then performs a background-prioritized warping operation toward the reference point on the low-correlation region of the left depth image, and supplies the resultant image as a left depth low-correlation image to the screen multiplexing unit 157. The warping unit 153 also performs a background-prioritized warping operation toward the reference point on the low-correlation region of the input left color image by using the left depth low-correlation image, and supplies the resultant image as a left color low-correlation image to the screen multiplexing unit 157.

The warping unit 154, the color correlation determining unit 155, and the warping unit 156 perform the same operations with respect to the right viewpoint as those performed by the warping unit 151, the color correlation determining unit 152, and the warping unit 153.

Specifically, the warping unit 154 performs a foreground-prioritized warping operation toward the right viewpoint on the reference-point color image by using the reference-point depth image, to generate the reference-point color image of the right viewpoint. The right-viewpoint occlusion region in the reference-point color image of the right viewpoint is a black image, for example. The warping unit 154 supplies the generated reference-point color image of the right viewpoint to the color correlation determining unit 155.

The color correlation determining unit 155 determines, for each pixel, the difference between an input right color image and the reference-point color image of the right viewpoint supplied from the warping unit 154. Like the color correlation determining unit 152, the color correlation determining unit 155 generates, for each pixel, color correlation information based on the determined difference. The color correlation determining unit 155 supplies the generated color correlation information as the right-viewpoint color correlation information to the warping unit 156.

Based on the right-viewpoint color correlation information supplied from the color correlation determining unit 155, the warping unit 156 detects low-correlation regions from the right depth image and the right color image. That is, the warping unit 156 detects the low-correlation regions including the right-viewpoint occlusion regions that appear in the reference-point color image and the reference-point depth image of the right viewpoint, from the right depth image and the right color image.

The warping unit 156 then performs a background-prioritized warping operation toward the reference point on the low-correlation region of the right depth image, and supplies the resultant image as a right depth low-correlation image to the screen multiplexing unit 157. The warping unit 156 also performs a background-prioritized warping operation toward the reference point on the low-correlation region of the input right color image by using the right depth low-correlation image, and supplies the resultant image as a right depth low-correlation image to the screen multiplexing unit 157.

The screen multiplexing unit 157 multiplexes the left depth low-correlation image supplied from the warping unit 153 and the right depth low-correlation image supplied from the warping unit 156 into one screen. The screen multiplexing unit 157 then supplies the resultant background depth image to the chroma component converting unit 78, the background depth image having the depth value of each pixel as a luminance component and a predetermined value as a chroma component. The predetermined value may be 0 or the depth value of the reference-point depth image, for example. The screen multiplexing unit 157 also generates the right/left specifying information for each pixel, and supplies the right/left specifying information to the chroma component converting unit 78.

The screen multiplexing unit 157 multiplexes the left color low-correlation image supplied from the warping unit 153 and the right color low-correlation image supplied from the warping unit 156 into one screen. The screen multiplexing unit 157 functions as the transmitting unit, and transmits the image obtained as a result of the multiplexing, as the background color image to the inverse format conversion device 52 via the multi-view image encoding device 12 and the multi-view image decoding device 13 shown in FIG. 5.

The reference-point depth image and the reference-point color image that are input to the format conversion device 51 shown in FIG. 15 are supplied to the multi-view image encoding device 12 without any change.

[Description of a Second Example Operation of the Format Conversion Device]

Figure 16:
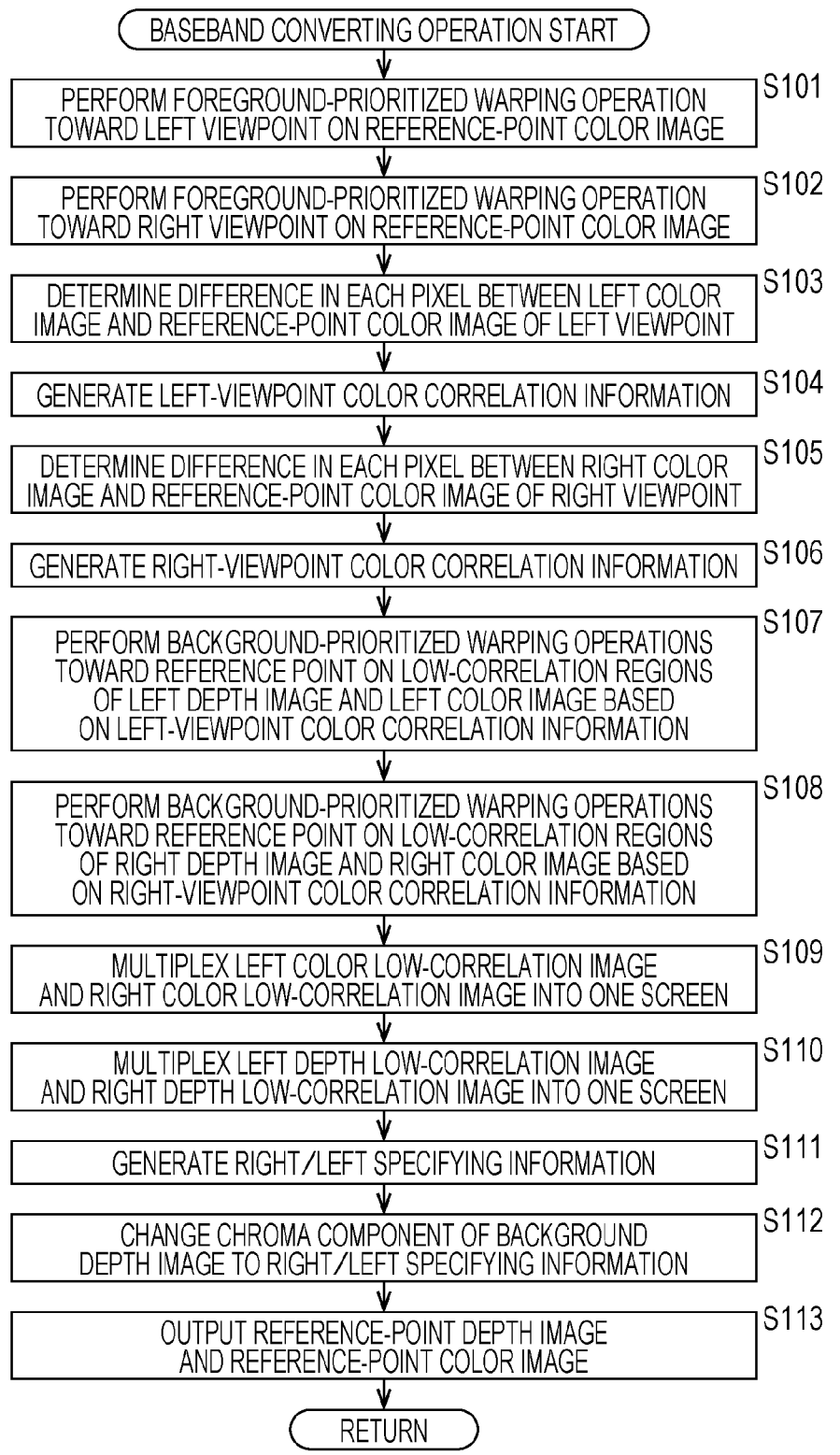
FIG. 16 is a flowchart for explaining in detail a baseband converting operation to be performed by the format conversion device shown in FIG. 15.

FIG. 16 is a flowchart for explaining in detail the baseband converting operation of step S13 of FIG. 6, which is performed by the format conversion device 51 shown in FIG. 15.

In step S101 of FIG. 16, the warping unit 151 of the format conversion device 51 performs a foreground-prioritized warping operation toward the left viewpoint on a reference-point color image by using an input reference-point depth image, to generate the reference-point color image of the left viewpoint. The warping unit 151 supplies the generated reference-point color image of the left viewpoint to the color correlation determining unit 152.

In step S102, the warping unit 154 performs a foreground-prioritized warping operation toward the right viewpoint on the reference-point color image by using the input reference-point depth image, to generate the reference-point color image of the right viewpoint. The warping unit 154 supplies the generated reference-point color image of the right viewpoint to the color correlation determining unit 155.

In step S103, the color correlation determining unit 152 determines, for each pixel, the difference between an input left color image and the reference-point color image of the left viewpoint supplied from the warping unit 151.

In step S104, the color correlation determining unit 152 generates, for each pixel, the left-viewpoint color correlation information based on the difference determined in step S103, and supplies the left-viewpoint color correlation information to the warping unit 153.

In step S105, the color correlation determining unit 155 determines, for each pixel, the difference between an input right color image and the reference-point color image of the right viewpoint supplied from the warping unit 154.

In step S106, like the color correlation determining unit 152, the color correlation determining unit 155 generates, for each pixel, right-viewpoint color correlation information based on the difference determined in step S105, and supplies the right-viewpoint color correlation information to the warping unit 156.

In step S107, based on the left-viewpoint color correlation information supplied from the color correlation determining unit 152, the warping unit 153 performs background-prioritized warping operations toward the reference point on the low-correlation regions of the left depth image and the left color image. The warping unit 153 then supplies the left depth low-correlation image and the left color low-correlation image obtained as a result of the warping operations, to the screen multiplexing unit 157.

In step S108, based on the right-viewpoint color correlation information supplied from the color correlation determining unit 155, the warping unit 156 performs background-prioritized warping operations toward the reference point on the low-correlation regions of the right depth image and the right color image. The warping unit 156 then supplies the right depth low-correlation image and the right color low-correlation image obtained as a result of the warping operations, to the screen multiplexing unit 157.

In step S109, the screen multiplexing unit 157 multiplexes the left color low-correlation image supplied from the warping unit 153 and the right color low-correlation image supplied from the warping unit 156 into one screen. The screen multiplexing unit 157 then supplies the background color image obtained as a result of the multiplexing to the multi-view image encoding device 12 shown in FIG. 5.

In step S110, the screen multiplexing unit 157 multiplexes the left depth low-correlation image supplied from the warping unit 153 and the right depth low-correlation image supplied from the warping unit 156 into one screen. The screen multiplexing unit 157 then supplies the resultant background depth image to the chroma component converting unit 78, the background depth image having the depth value of each pixel as a luminance component and a predetermined value as a chroma component.

The procedures of steps S111 through S113 are the same as the procedures of steps S41 through S43 of FIG. 12, and therefore, explanation of them is not repeated herein. After the procedure of step S113, the baseband converting operation comes to an end.

As described above, the format conversion device 51 shown in FIG. 15 determines the difference in each pixel between the reference-point color image of the left viewpoint and the left color image by using the reference-point color image of the left viewpoint. Based on the difference, the format conversion device 51 detects the low-correlation regions including the left-viewpoint occlusion regions. Likewise, the format conversion device 51 detects the low-correlation regions including the right-viewpoint occlusion regions by using the reference-point color image of the right viewpoint.

Accordingly, the format conversion device 51 can accurately detect the left-viewpoint occlusion region and the right-viewpoint occlusion region that appear at the inverse format conversion device 52 even when the precision of the reference-point depth image is low. As a result, the inverse format conversion device 52 can prevent the left color image, the left depth image, the right color image, and the right depth image from breaking, by interpolating the left-viewpoint occlusion region and the right-viewpoint occlusion region with the background color image and the background depth image, even when the precision of the reference-point depth image is low.

The structure of the inverse format conversion device 52 in a case where the image processing system 10 shown in FIG. 5 includes the format conversion device 51 shown in FIG. 15 is the same as the structure of the inverse format conversion device 52 shown in FIG. 13.

In this case, the screen combining units 123 and 124 preferentially select the background color image and the background depth image, so that the low-correlation regions of the left color image, the left depth image, the right color image, and the right depth image, which are input to the format conversion device 51 shown in FIG. 15, are used as the combined images. As a result, the image quality of the left color image, the left depth image, the right color image, and the right depth image, which are generated by the inverse format conversion device 52, becomes higher. For example, when the reference-point color image is a color image of an object that reflects light differently depending on angles, the image quality of the left color image and the right color image generated by the inverse format conversion device 52 becomes higher.

[Third Specific Example Structure of the Format Conversion Device]

Figure 17:
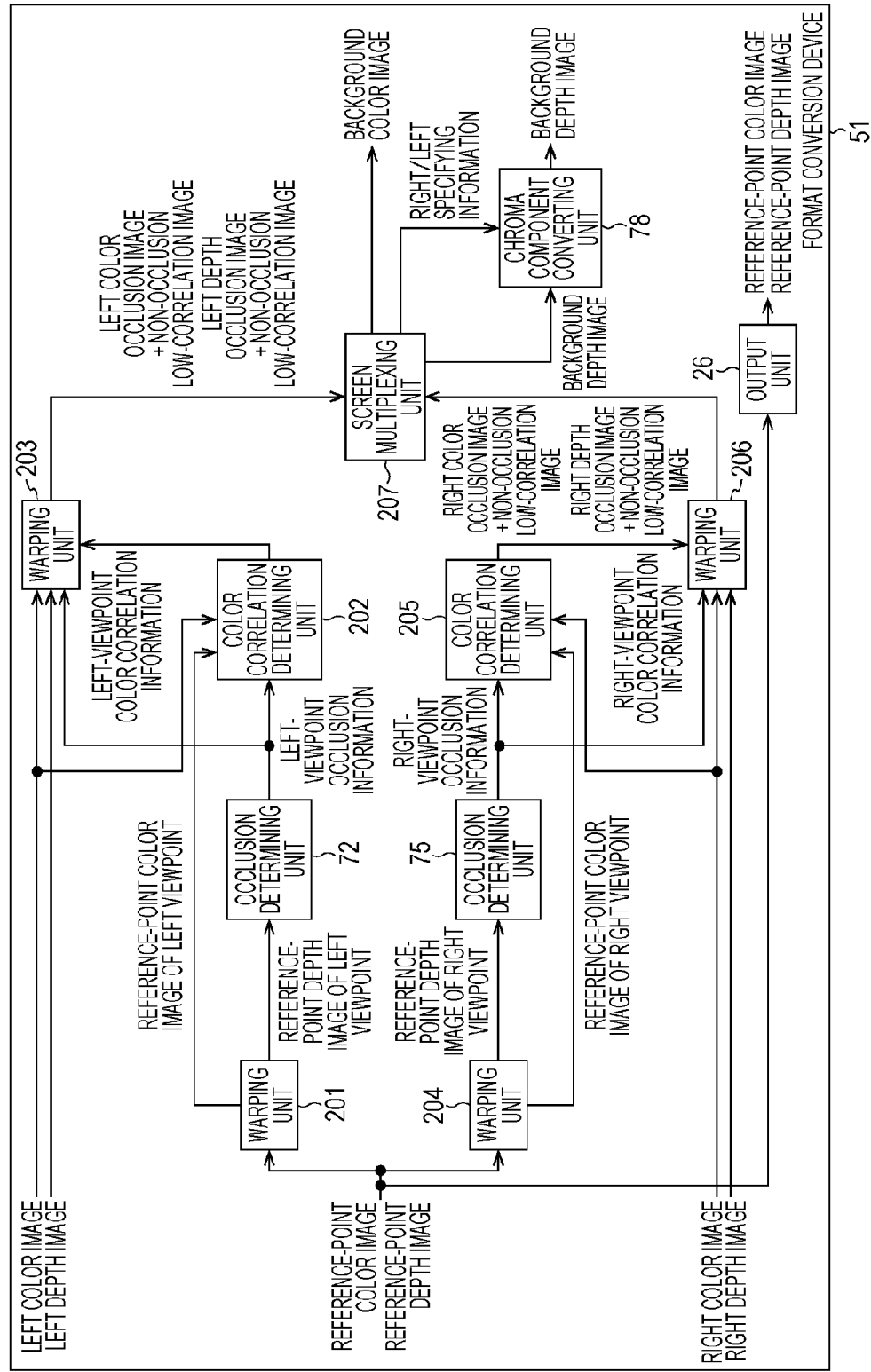
FIG. 17 is a block diagram showing a third specific example structure of the format conversion device shown in FIG. 5.

FIG. 17 is a block diagram showing a third specific example structure of the format conversion device 51 shown in FIG. 5.

In the structure illustrated in FIG. 17, the same components as those in FIG. 7 are denoted by the same reference numerals as those in FIG. 7. The explanations that have already been made will not be repeated.

The structure of the format conversion device 51 shown in FIG. 17 differs from the structure shown in FIG. 7, mainly in that the warping unit 71, the warping unit 73, the warping unit 74, the warping unit 76, and the screen multiplexing unit 77 are replaced with a warping unit 201, a warping unit 203, a warping unit 204, a warping unit 206, and a screen multiplexing unit 207, and color correlation determining units 202 and 205 are newly provided.

The format conversion device 51 shown in FIG. 17 locates the low-correlation region of a left depth image or a right depth image in a region other than the left-viewpoint occlusion regions and the right-viewpoint occlusion regions in a background depth image and a background color image, the left depth image or the right depth image corresponding to the region other than the left-viewpoint occlusion regions and the right-viewpoint occlusion regions.

Specifically, the warping unit 201 of the format conversion device 51 shown in FIG. 17 functions as the non-reference viewpoint warping unit, and performs a foreground-prioritized warping operation toward the left viewpoint on an input reference-point depth image, to generate the reference-point depth image of the left viewpoint. The warping unit 201 then performs a foreground-prioritized warping operation toward the left viewpoint on an input color image by using the reference-point depth image of the left viewpoint, to generate the reference-point color image of the left viewpoint. The left-viewpoint occlusion region in the reference-point color image of the left viewpoint may be a black image, for example. The warping unit 201 supplies the generated reference-point depth image of the left viewpoint to the occlusion determining unit 72, and supplies the reference-point color image of the left viewpoint to the color correlation determining unit 202.

Based on the left-viewpoint occlusion information generated by the occlusion determining unit 72, the color correlation determining unit 202 determines the difference in each pixel between an input left color image and the reference-point color image of the left viewpoint minus the left-viewpoint occlusion regions. The color correlation determining unit 202 generates, for each pixel, color correlation information based on the determined difference, and supplies the generated color correlation information as the left-viewpoint color correlation information to the warping unit 203.

Based on the left-viewpoint occlusion information generated by the occlusion determining unit 72, the warping unit 203 detects the left-viewpoint occlusion regions from the left depth image and the left color image. Based on the left-viewpoint color correlation information supplied from the color correlation determining unit 202, the warping unit 203 also detects the low-correlation regions outside the left-viewpoint occlusion regions in the left depth image and the left color image (hereinafter referred to as the left-viewpoint non-occlusion low-correlation regions). The warping unit 153 then performs background-prioritized warping operations toward the reference point on the left-viewpoint occlusion region and the left-viewpoint non-occlusion low-correlation region in the left depth image. The warping unit 203 supplies the resultant left depth occlusion image and the resultant left depth non-occlusion low-correlation image that is an image of the left-viewpoint non-occlusion low-correlation region, to the screen multiplexing unit 207.

The warping unit 203 also performs background-prioritized warping operations toward the reference point on the left-viewpoint occlusion region and the left-viewpoint non-occlusion low-correlation region in the input left color image, by using the left depth occlusion image and non-occlusion low-correlation image. The warping unit 203 supplies the resultant left color occlusion image and the resultant left color non-occlusion low-correlation image that is an image of the left-viewpoint non-occlusion low-correlation region, to the screen multiplexing unit 207.

The warping unit 204 performs a foreground-prioritized warping operation toward the right viewpoint on the input reference-point depth image, to generate the reference-point depth image of the right viewpoint. The warping unit 204 performs a foreground-prioritized warping operation toward the right viewpoint on the input color image by using the reference-point depth image of the right viewpoint, to generate the reference-point color image of the right viewpoint. The right-viewpoint occlusion region in the reference-point color image of the right viewpoint is a black image, for example. The warping unit 204 supplies the generated reference-point depth image of the right viewpoint to the occlusion determining unit 75, and supplies the reference-point color image of the right viewpoint to the color correlation determining unit 205.

Based on the right-viewpoint occlusion information generated by the occlusion determining unit 75, the color correlation determining unit 205 determines the difference in each pixel between an input right color image and the reference-point color image of the right viewpoint minus the right-viewpoint occlusion regions. The color correlation determining unit 205 generates, for each pixel, color correlation information based on the determined difference, and supplies the color correlation information as the right-viewpoint color correlation information to the warping unit 206.

Based on the right-viewpoint occlusion information generated by the occlusion determining unit 72, the warping unit 206 detects the right-viewpoint occlusion regions from the right depth image and the right color image. Based on the right-viewpoint color correlation information supplied from the color correlation determining unit 205, the warping unit 206 also detects the low-correlation regions outside the right-viewpoint occlusion regions in the right depth image and the right color image (hereinafter referred to as the right-viewpoint non-occlusion low-correlation regions). The warping unit 206 then performs background-prioritized warping operations toward the reference point on the right-viewpoint occlusion region and the right-viewpoint non-occlusion low-correlation region in the right depth image. The warping unit 206 supplies the resultant right depth occlusion image and the resultant right depth non-occlusion low-correlation image that is an image of the right-viewpoint non-occlusion low-correlation region, to the screen multiplexing unit 207.

The warping unit 206 also performs background-prioritized warping operations toward the reference point on the right-viewpoint occlusion region and the right-viewpoint non-occlusion low-correlation region in the input right color image, by using the right depth occlusion image and non-occlusion low-correlation image. The warping unit 206 supplies the resultant right color occlusion image and the resultant right color non-occlusion low-correlation image that is an image of the right-viewpoint non-occlusion low-correlation region, to the screen multiplexing unit 207.

The screen multiplexing unit 207 multiplexes the left depth occlusion image and non-occlusion low-correlation image supplied from the warping unit 203, and the right depth occlusion image and non-occlusion low-correlation image supplied from the warping unit 206, into one screen. The screen multiplexing unit 207 then supplies the resultant background depth image to the chroma component converting unit 78, the background depth image having the depth value of each pixel as a luminance component and a predetermined value as a chroma component. The predetermined value may be 0 or the depth value of the reference-point depth image, for example. The screen multiplexing unit 207 also generates the right/left specifying information for each pixel, and supplies the right/left specifying information to the chroma component converting unit 78.

The screen multiplexing unit 207 also multiplexes the left color occlusion image and non-occlusion low-correlation image supplied from the warping unit 203, and the right color occlusion image and non-occlusion low-correlation image supplied from the warping unit 206, into one screen. The screen multiplexing unit 207 functions as the transmitting unit, and transmits the image obtained as a result of the multiplexing, as the background color image to the inverse format conversion device 52 via the multi-view image encoding device 12 and the multi-view image decoding device 13 shown in FIG. 5.

[Description of a Third Example Operation of the Format Conversion Device]

Figure 18:
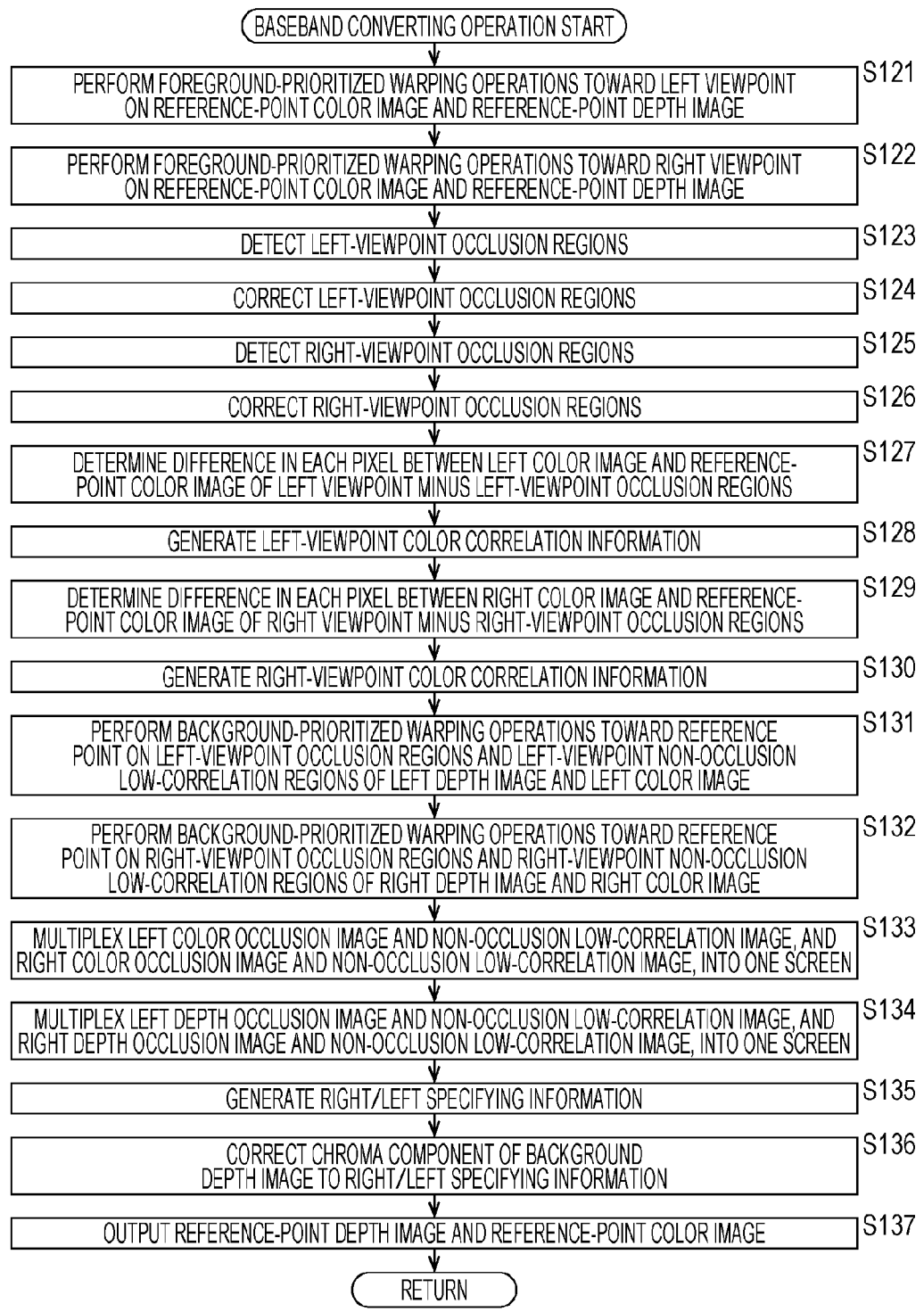
FIG. 18 is a flowchart for explaining in detail a baseband converting operation to be performed by the format conversion device shown in FIG. 17.

FIG. 18 is a flowchart for explaining in detail the baseband converting operation of step S13 of FIG. 6, which is performed by the format conversion device 51 shown in FIG. 17.

In step S121 of FIG. 18, the warping unit 201 of the format conversion device 51 shown in FIG. 17 performs a foreground-prioritized warping operation toward the left viewpoint on a reference-point color image and a reference-point depth image that are input thereto. The warping unit 201 supplies the resultant reference-point depth image of the left viewpoint to the occlusion determining unit 72, and supplies the resultant reference-point color image of the left viewpoint to the color correlation determining unit 202.

In step S122, the warping unit 204 performs foreground-prioritized warping operations toward the right viewpoint on the reference-point color image and the reference-point depth image that are input thereto. The warping unit 204 supplies the resultant reference-point depth image of the right viewpoint to the occlusion determining unit 75, and supplies the resultant reference-point color image of the right viewpoint to the color correlation determining unit 205.

The procedures of steps S123 through S126 are the same as the procedures of steps S33 through S36 of FIG. 12, and therefore, explanation of them is not repeated herein.

In step S127, based on the left-viewpoint occlusion information generated by the occlusion determining unit 72, the color correlation determining unit 202 determines the difference in each pixel between an input left color image and the reference-point color image of the left viewpoint minus the left-viewpoint occlusion regions.

In step S128, the color correlation determining unit 202 generates the left-viewpoint color correlation information based on the difference determined for each pixel in step S127, and supplies the left-viewpoint color correlation information to the warping unit 203.

In step S129, based on the right-viewpoint occlusion information generated by the occlusion determining unit 75, the color correlation determining unit 205 determines the difference in each pixel between an input right color image and the reference-point color image of the right viewpoint minus the right-viewpoint occlusion regions.

In step S130, the color correlation determining unit 205 generates right-viewpoint color correlation information based on the difference determined for each pixel in step S129, and supplies the right-viewpoint color correlation information to the warping unit 206.

In step S131, based on the left-viewpoint occlusion information and color correlation information, the warping unit 203 performs background-prioritized warping operations toward the reference point on the left-viewpoint occlusion regions and the left-viewpoint non-occlusion low-correlation regions in the left depth image and the left color image. The warping unit 203 supplies the resultant left depth occlusion image and non-occlusion low-correlation image, and the resultant left color occlusion image and non-occlusion low-correlation image to the screen multiplexing unit 207.

In step S132, based on the right-viewpoint occlusion information and color correlation information, the warping unit 206 performs background-prioritized warping operations toward the reference point on the right-viewpoint occlusion regions and the right-viewpoint non-occlusion low-correlation regions in the right depth image and the right color image. The warping unit 206 supplies the resultant right depth occlusion image and non-occlusion low-correlation image, and the resultant right color occlusion image and non-occlusion low-correlation image to the screen multiplexing unit 207.

In step S133, the screen multiplexing unit 207 multiplexes the left color occlusion image and non-occlusion low-correlation image, and the right color occlusion image and non-occlusion low-correlation image, into one screen. The screen multiplexing unit 207 then supplies the background color image obtained as a result of the multiplexing to the multi-view image encoding device 12 shown in FIG. 5.

In step S134, the screen multiplexing unit 207 multiplexes the left depth occlusion image and non-occlusion low-correlation image, and the right depth occlusion image and non-occlusion low-correlation image, into one screen. The screen multiplexing unit 207 then supplies the background depth image obtained as a result of the multiplexing to the chroma component converting unit 78, the background depth image having the depth value of each pixel as a luminance component and a predetermined value as a chroma component.

The procedures of steps S135 through S137 are the same as the procedures of steps S41 through S43 of FIG. 12, and therefore, explanation of them is not repeated herein. After the procedure of step S137, the baseband converting operation comes to an end.

As described above, the format conversion device 51 shown in FIG. 17 detects the left-viewpoint occlusion region and the right-viewpoint occlusion region by using the reference-point depth images of the left viewpoint and the right viewpoint, like the format conversion device 51 shown in FIG. 7. As a result, the inverse format conversion device 52 can prevent the left color image, the left depth image, the right color image, and the right depth image from breaking, even when the precision of the reference-point depth image is low.

The structure of the inverse format conversion device 52 in a case where the image processing system 10 shown in FIG. 5 includes the format conversion device 51 shown in FIG. 17 is the same as the structure of the inverse format conversion device 52 shown in FIG. 13.

In this case, the screen combining units 123 and 124 preferentially select the background color image and the background depth image, so that the left-viewpoint occlusion regions and the left-viewpoint non-occlusion low-correlation regions of the left color image and the left depth image, which are input to the format conversion device 51 shown in FIG. 17, are used as the combined images. The right-viewpoint occlusion regions and the right-viewpoint non-occlusion low-correlation regions of the right color image and the right depth image, which are input to the format conversion device 51 shown in FIG. 17, are also used. As a result, the image quality of the left color image, the left depth image, the right color image, and the right depth image, which are generated by the inverse format conversion device 52, becomes higher.

In this embodiment, the left depth image and the left color image are left when there are overlapping objects to be multiplexed by the format conversion device 51. In the format conversion devices 51 shown in FIGS. 15 and 17, however, an object to be multiplexed, whichever has the lower correlation, may be left. Alternatively, an object to be multiplexed, whichever has the higher priority, may be left.

In the above description, the right/left specifying information is represented by the value of a predetermined bit in the chroma component, as shown in FIG. 11. However, the right/left specifying information may be represented by a numerical value. In such a case, the values of 0 through 255 represented by the eight bits of each chroma component are divided by 9, and the right/left specifying information about two pixels corresponding to the chroma component is represented by a value that is a multiple of 28.

When the right/left specifying information about the two pixels indicates "left", for example, the value of the chroma component is 0. When the right/left specifying information about the left pixel of the two pixels indicates "left", and the right/left specifying information about the right pixel indicates "right", the value is 28. When the right/left specifying information about the left pixel of the two pixels indicates "left", and the right/left specifying information about the right pixel indicates "right and left", the value is 56.

When the right/left specifying information about the two pixels indicates "right", the value of the chroma component is 84. When the right/left specifying information about the left pixel of the two pixels indicates "right", and the right/left specifying information about the right pixel indicates "left", the value is 112. When the right/left specifying information about the left pixel of the two pixels indicates "right", and the right/left specifying information about the right pixel indicates "right and left", the value is 140.

When the right/left specifying information about the two pixels indicates "right and left", the value of the chroma component is 168. When the right/left specifying information about the left pixel of the two pixels indicates "right and left", and the right/left specifying information about the right pixel indicates "left", the value is 196. When the right/left specifying information about the left pixel of the two pixels indicates "right", and the right/left specifying information about the right pixel indicates "right", the value is 224.

When the right/left specifying information is represented by the numerical value of the chroma component as described above, the intervals between the possible numerical values are the largest, and accordingly, the right/left specifying information is not easily affected by distortions caused by compression.

Alternatively, the right/left specifying information may not be represented by the chroma component of the background depth image, but may be transmitted independently of the background depth image. In that case, the right/left specifying information may not be encoded, and may be transmitted through a different system from bit streams. Alternatively, the right/left specifying information may be encoded, and be transmitted through a different system from bit streams.

Second Embodiment

Description of a Computer to which the Present Technique is Applied

The above described series of operations can be performed with hardware, and can also be performed with software. Where the series of operations are performed with software, the program that forms the software is installed into a general-purpose computer or the like.

Figure 20:
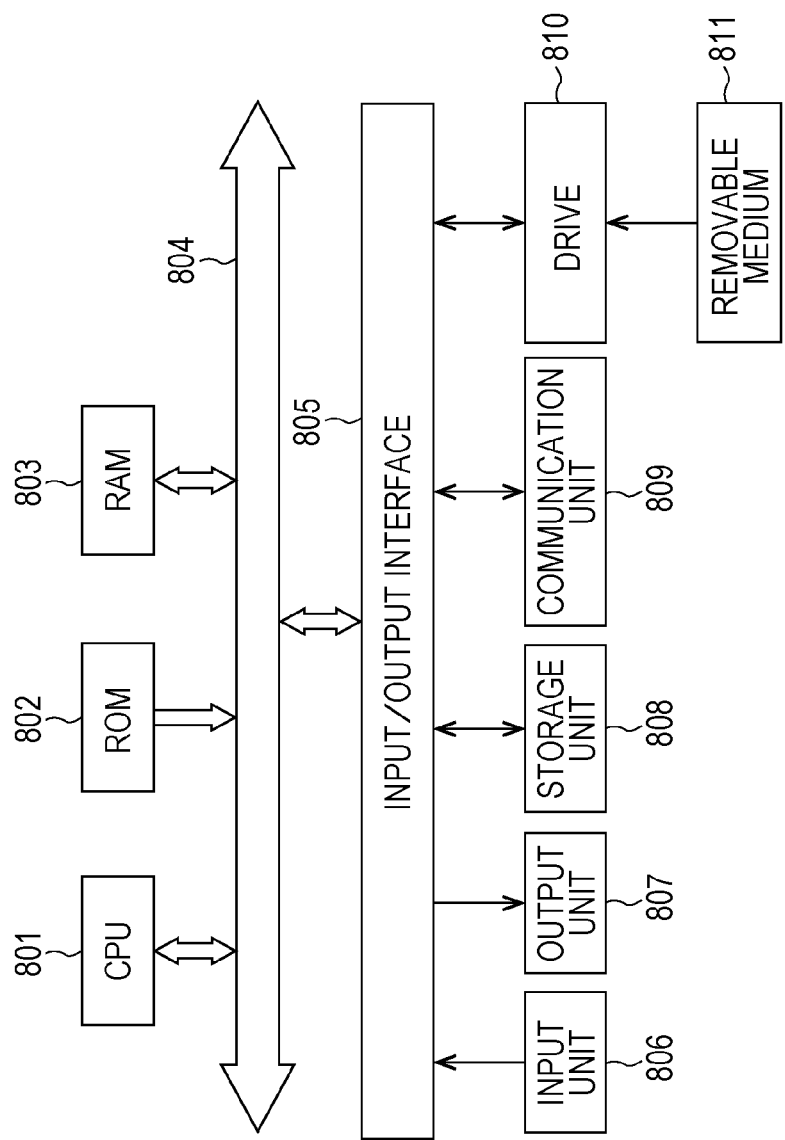
FIG. 20 is a diagram showing an example structure of an embodiment of a computer.

In view of this, FIG. 20 shows an example structure of an embodiment of a computer into which the program for performing the above described series of operations is installed.

The program can be recorded beforehand in a storage unit 808 or a ROM (Read Only Memory) 802 provided as a recording medium in the computer.

Alternatively, the program can be stored (recorded) in a removable medium 811. Such a removable medium 811 can be provided as so-called packaged software. Here, the removable medium 811 may be a flexible disk, a CD-ROM (Compact Disc Read Only Memory), an MO (Magneto Optical) disk, a DVD (Digital Versatile Disc), a magnetic disk, or a semiconductor memory, for example.

The program can be installed into the computer from the above described removable medium 811 via a drive 810, but can also be downloaded into the computer via a communication network or a broadcasting network and be installed into the internal storage unit 808. That is, the program can be wirelessly transferred from a download site, for example, to the computer via an artificial satellite for digital satellite broadcasting, or can be transferred by cable to the computer via a network such as a LAN (Local Area Network) or the Internet.

The computer includes a CPU (Central Processing Unit) 801, and an input/output interface 805 is connected to the CPU 801 via a bus 804.

When an instruction is input by a user operating an input unit 806 or the like via the input/output interface 805, the CPU 801 executes the program stored in the ROM 802 accordingly. Alternatively, the CPU 801 loads the program stored in the storage unit 808 into a RAM (Random Access Memory) 803, and executes the program.

By doing so, the CPU 801 performs the operations according to the above described flowcharts, or performs the operations with the structures illustrated in the above described block diagrams. Where necessary, the CPU 801 outputs the operation results from an output unit 807 or transmit the operation results from a communication unit 809, via the input/output interface 805, for example, and further stores the operation results into the storage unit 808.

The input unit 806 is formed with a keyboard, a mouse, a microphone, and the like. The output unit 807 is formed with a LCD (Liquid Crystal Display), a speaker, and the like.

In this specification, the operations performed by the computer in accordance with the program are not necessarily performed in chronological order compliant with the sequences shown in the flowcharts. That is, the operations to be performed by the computer in accordance with the program include operations to be performed in parallel or independently of one another (such as parallel operations or object-based operations).

The program may be executed by one computer (processor), or may be executed in a distributive manner by more than one computer. Further, the program may be transferred to a remote computer, and be executed therein.

The present technique can be applied to an image processing system that is used for reception via a network medium such as satellite broadcasting, cable TV (television), the Internet, or a portable telephone device, or for processing in a storage medium such as an optical or magnetic disk or a flash memory.

The above described image processing system can also be applied to any electronic apparatuses. The following is a description of such examples.

Third Embodiment

Example Structure of a Television Apparatus

Figure 21:
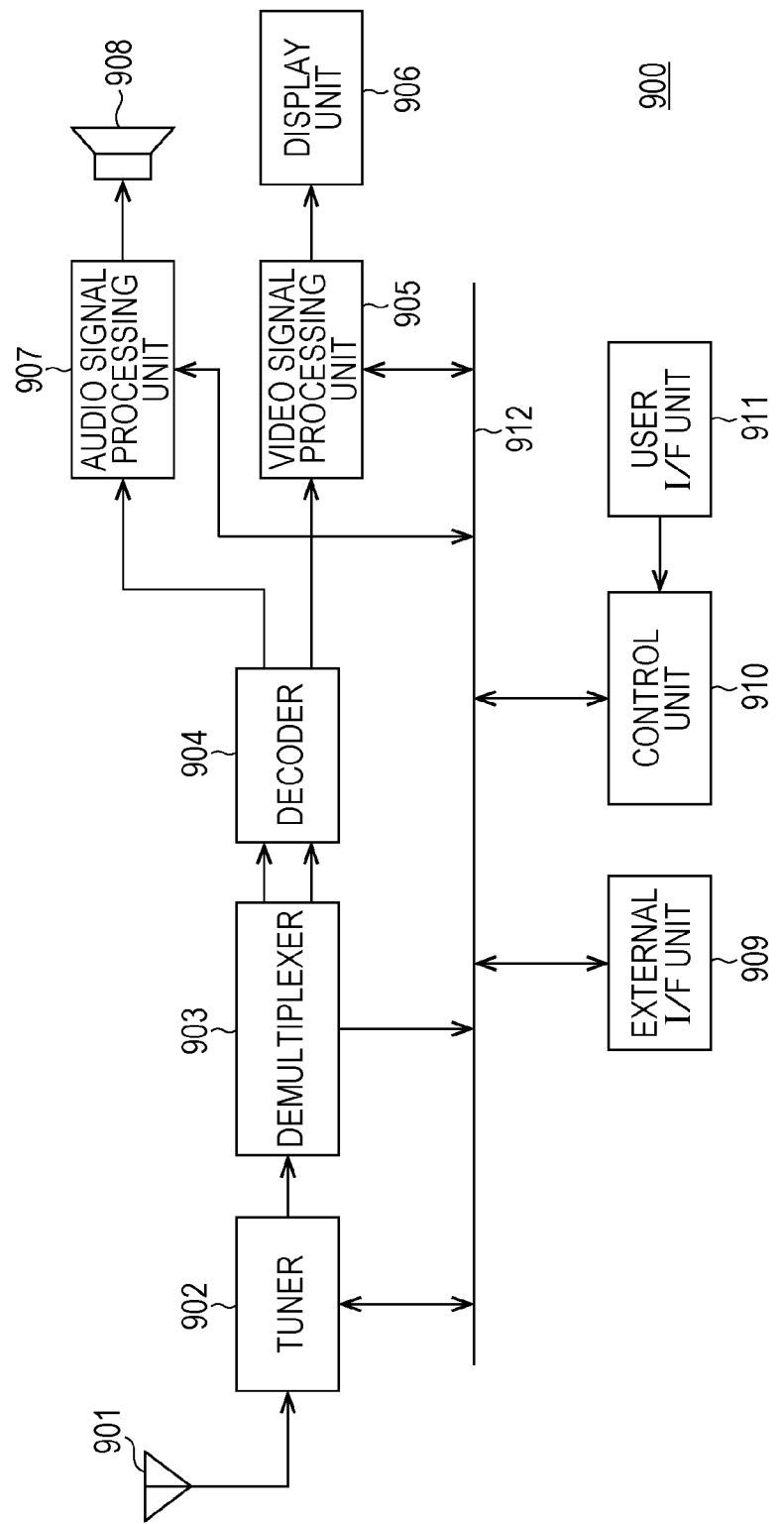
FIG. 21 is a block diagram showing an example structure of a television apparatus to which the present technique is applied.

FIG. 21 schematically shows an example structure of a television apparatus to which the present technique is applied. The television apparatus 900 includes an antenna 901, a tuner 902, a demultiplexer 903, a decoder 904, a video signal processing unit 905, a display unit 906, an audio signal processing unit 907, a speaker 908, and an external interface unit 909. The television apparatus 900 further includes a control unit 910, a user interface unit 911, and the like.

The tuner 902 selects a desired channel from broadcast wave signals received at the antenna 901, and performs demodulation. The resultant encoded bit stream is output to the demultiplexer 903.

The demultiplexer 903 extracts the video and audio packets of the show to be viewed from the encoded bit stream, and outputs the data of the extracted packets to the decoder 904. The demultiplexer 903 also supplies a packet of data such as EPG (Electronic Program Guide) to the control unit 910. Where scrambling is performed, the demultiplexer or the like cancels the scrambling.

The decoder 904 performs a packet decoding operation, and outputs the video data generated through the decoding operation to the video signal processing unit 905, and the audio data to the audio signal processing unit 907.

The video signal processing unit 905 subjects the video data to a noise removal and video processing or the like in accordance with user settings. The video signal processing unit 905 generates video data of the show to be displayed on the display unit 906, or generates image data or the like through an operation based on an application supplied via a network. The video signal processing unit 905 also generates video data for displaying a menu screen or the like for item selection, and superimposes the video data on the video data of the show. Based on the video data generated in this manner, the video signal processing unit 905 generates a drive signal to drive the display unit 906.

Based on the drive signal from the video signal processing unit 905, the display unit 906 drives a display device (a liquid crystal display element, for example) to display the video of the show.

The audio signal processing unit 907 subjects the audio data to predetermined processing such as a noise removal, and performs a D/A conversion operation and an amplification operation on the processed audio data. The resultant audio data is supplied as an audio output to the speaker 908.

The external interface unit 909 is an interface for a connection with an external device or a network, and transmits and receives data such as video data and audio data.

The user interface unit 911 is connected to the control unit 910. The user interface unit 911 is formed with operation switches, a remote control signal receiving unit, and the like, and supplies an operating signal according to a user operation to the control unit 910.

The control unit 910 is formed with a CPU (Central Processing Unit), a memory, and the like. The memory stores the program to be executed by the CPU, various kinds of data necessary for the CPU to perform operations, the EPG data, data obtained via a network, and the like. The program stored in the memory is read and executed by the CPU at a predetermined time such as the time of activation of the television apparatus 900. The CPU executes the program to control the respective components so that the television apparatus 900 operates in accordance with a user operation.

In the television apparatus 900, a bus 912 is provided for connecting the tuner 902, the demultiplexer 903, the video signal processing unit 905, the audio signal processing unit 907, the external interface unit 909, and the like, to the control unit 910.

In the television apparatus having such a structure, the function of an image processing device (an image processing method) of the present invention is provided in the decoder 904. Accordingly, when the occlusion regions of color images and depth images of the viewpoints other than the reference point are transmitted, high-quality color images and depth images of the viewpoints other than the reference point can be generated even if the precision of the reference-point depth image is low.

Fourth Embodiment

Example Structure of a Portable Telephone Device

Figure 22:
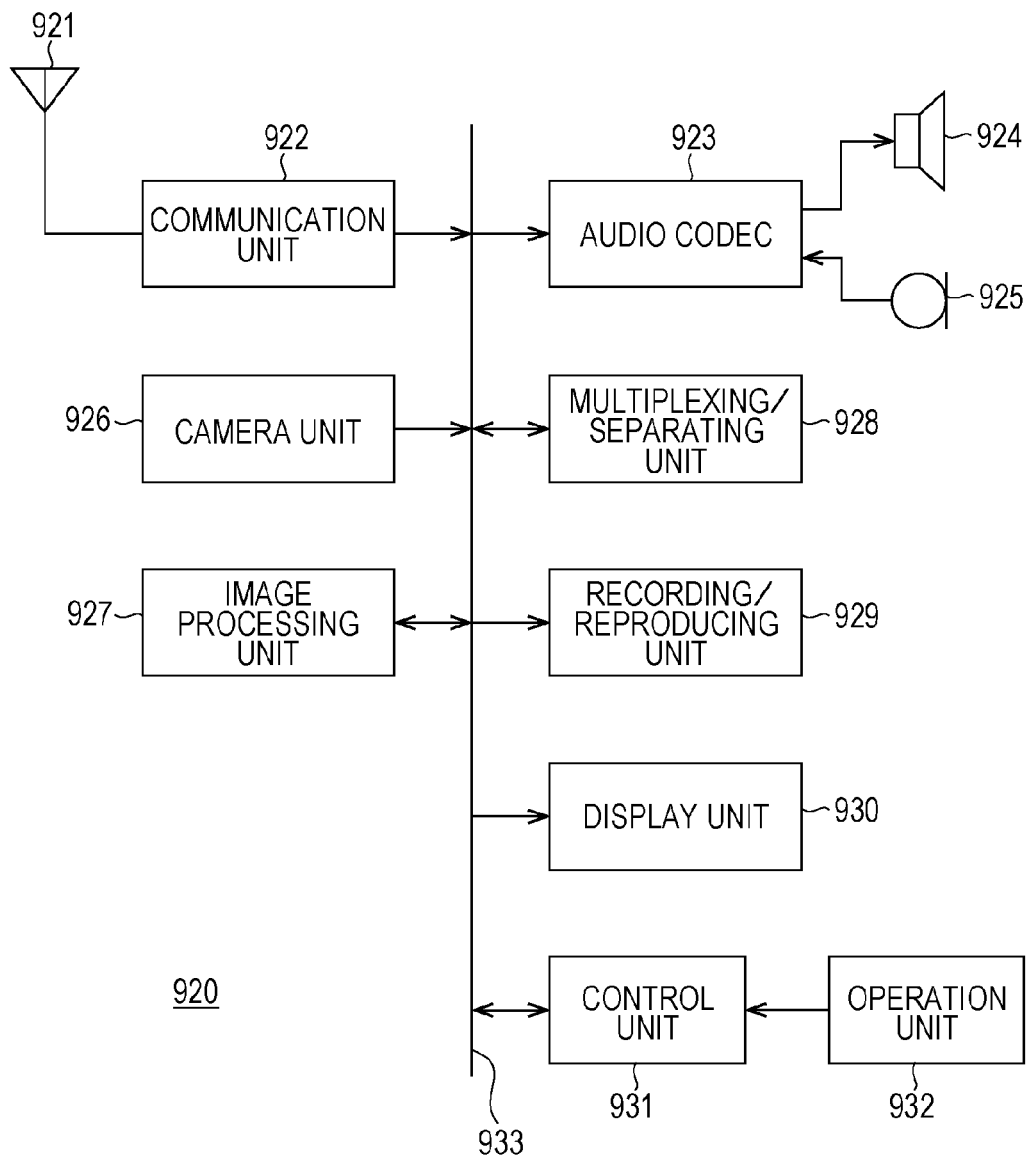
FIG. 22 is a block diagram showing an example structure of a portable telephone device to which the present technique is applied.

FIG. 22 schematically shows an example structure of a portable telephone device to which the present technique is applied. The portable telephone device 920 includes a communication unit 922, an audio codec 923, a camera unit 926, an image processing unit 927, a multiplexing/separating unit 928, a recording/reproducing unit 929, a display unit 930, and a control unit 931. Those components are connected to one another via a bus 933.

Also, an antenna 921 is connected to the communication unit 922, and a speaker 924 and a microphone 925 are connected to the audio codec 923. Further, an operation unit 932 is connected to the control unit 931.

The portable telephone device 920 performs various kinds of operations such as transmission and reception of audio signals, transmission and reception of electronic mail and image data, image capturing, and data recording, in various kinds of modes such as an audio communication mode and a data communication mode.

In the audio communication mode, an audio signal generated at the microphone 925 is converted into audio data, and the data is compressed at the audio codec 923. The compressed data is supplied to the communication unit 922. The communication unit 922 performs a modulation operation, a frequency conversion operation, and the like on the audio data, to generate a transmission signal. The communication unit 922 also supplies the transmission signal to the antenna 921, and the transmission signal is transmitted to a base station (not shown). The communication unit 922 also amplifies a signal received at the antenna 921, and performs a frequency conversion operation, a demodulation operation, and the like. The resultant audio data is supplied to the audio codec 923. The audio codec 923 decompresses audio data, and converts the audio data into an analog audio signal to be output to the speaker 924.

When mail transmission is performed in the data communication mode, the control unit 931 receives text data that is input by operating the operation unit 932, and the input text is displayed on the display unit 930. In accordance with a user instruction or the like through the operation unit 932, the control unit 931 generates and supplies mail data to the communication unit 922. The communication unit 922 performs a modulation operation, a frequency conversion operation, and the like on the mail data, and transmits the resultant transmission signal from the antenna 921. The communication unit 922 also amplifies a signal received at the antenna 921, and performs a frequency conversion operation, a demodulation operation, and the like, to restore the mail data. This mail data is supplied to the display unit 930, and the content of the mail is displayed.

The portable telephone device 920 can cause the recording/reproducing unit 929 to store received mail data into a storage medium. The storage medium is a rewritable storage medium. For example, the storage medium may be a semiconductor memory such as a RAM or an internal flash memory, a hard disk, or a removable medium such as a magnetic disk, a magnetooptical disk, an optical disk, a USB memory, or a memory card.

When image data is transmitted in the data communication mode, image data generated at the camera unit 926 is supplied to the image processing unit 927. The image processing unit 927 performs an encoding operation on the image data, to generate encoded data.

The multiplexing/separating unit 928 multiplexes the encoded data generated at the image processing unit 927 and the audio data supplied from the audio codec 923 by a predetermined technique, and supplies the multiplexed data to the communication unit 922. The communication unit 922 performs a modulation operation, a frequency conversion operation, and the like on the multiplexed data, and transmits the resultant transmission signal from the antenna 921. The communication unit 922 also amplifies a signal received at the antenna 921, and performs a frequency conversion operation, a demodulation operation, and the like, to restore the multiplexed data. This multiplexed data is supplied to the multiplexing/separating unit 928. The multiplexing/separating unit 928 divides the multiplexed data, and supplies the encoded data to the image processing unit 927, and the audio data to the audio codec 923. The image processing unit 927 performs a decoding operation on the encoded data, to generate image data. This image data is supplied to the display unit 930, to display the received images. The audio codec 923 converts the audio data into an analog audio signal and outputs the analog audio signal to the speaker 924, and the received sound is output.

In the portable telephone device having the above structure, the image processing unit 927 has the functions of an image processing device (an image processing method) of the present invention. Accordingly, in image data communications, the occlusion regions of color images and depth images of the viewpoints other than the reference point can be transmitted so that high-quality color images and depth images of the viewpoints other than the reference point can be generated on the receiving end even if the precision of the reference-point depth image is low. Also, when the occlusion regions of color images and depth images of the viewpoints other than the reference point are transmitted, high-quality color images and depth images of the viewpoints other than the reference point can be generated even if the precision of the reference-point depth image is low.

Fifth Embodiment

Example Structure of a Recording/Reproducing Device

Figure 23:
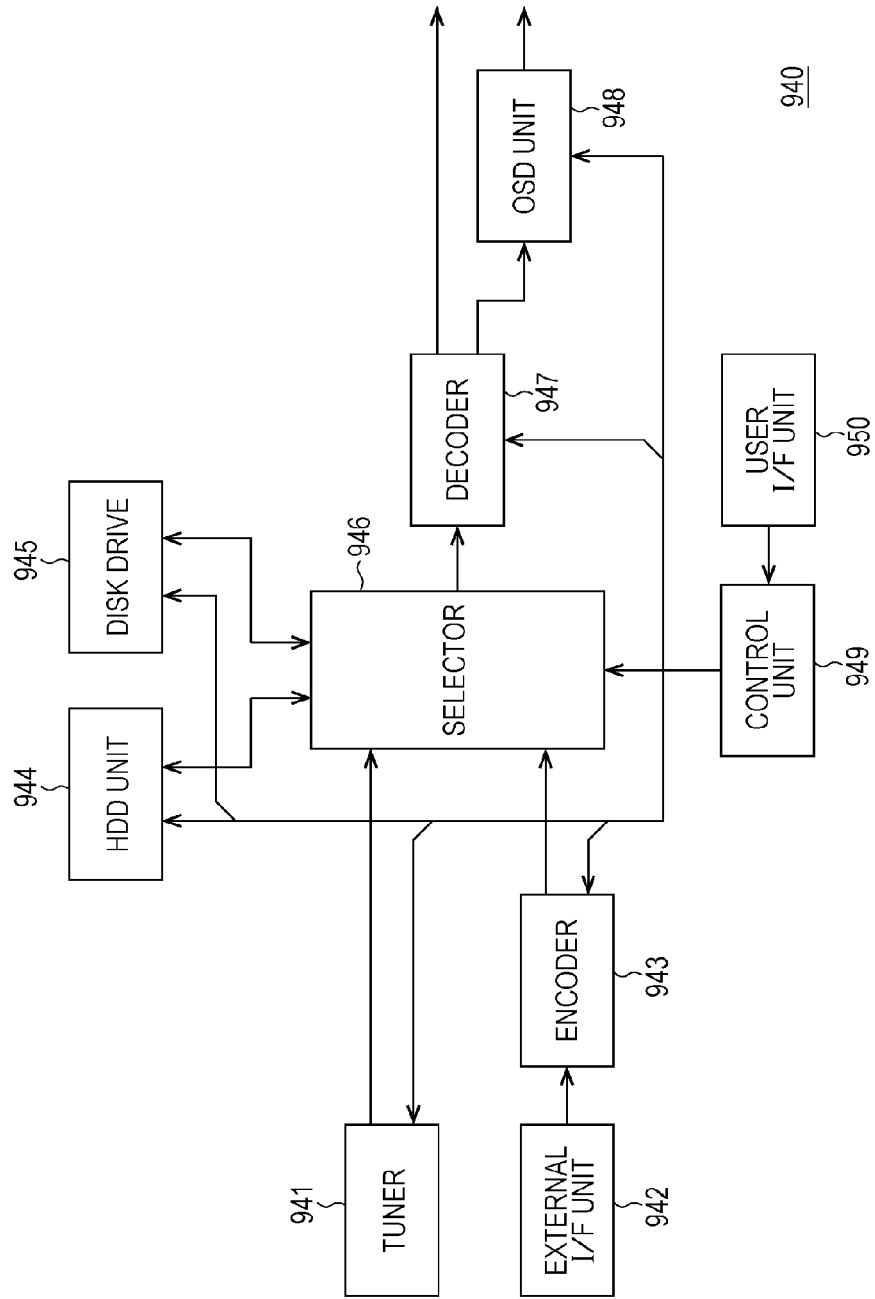
FIG. 23 is a diagram schematically showing an example structure of a recording/reproducing device to which the present technique is applied.

FIG. 23 schematically shows an example structure of a recording/reproducing device to which the present technique is applied. The recording/reproducing device 940 records the audio data and video data of a received broadcast show on a recording medium, for example, and provides the recorded data to a user at the time according to an instruction from the user. The recording/reproducing device 940 can also obtain audio data and video data from another device, for example, and record the data on a recording medium. Further, the recording/reproducing device 940 decodes and outputs audio data and video data recorded on a recording medium, so that a monitor device or the like can display images and outputs sound.

The recording/reproducing device 940 includes a tuner 941, an external interface unit 942, an encoder 943, a HDD (Hard Disk Drive) unit 944, a disk drive 945, a selector 946, a decoder 947, an OSD (On-Screen Display) unit 948, a control unit 949, and a user interface unit 950.

The tuner 941 selects a desired channel from broadcast signals received at an antenna (not shown). The tuner 941 demodulates the received signal of the desired channel, and outputs the resultant encoded bit stream to the selector 946.

The external interface unit 942 is formed with at least one of an IEEE1394 interface, a network interface unit, a USB interface, a flash memory interface, and the like. The external interface unit 942 is an interface for a connection with an external device, a network, a memory card, or the like, and receives data such as video data and audio data to be recorded and the like.

The encoder 943 performs predetermined encoding on video data and audio data that are supplied from the external interface unit 942 and are not encoded, and outputs an encoded bit stream to the selector 946.

The HDD unit 944 records content data such as videos and sound, various kinds of programs, and other data on an internal hard disk, and reads the data from the hard disk at the time of reproduction or the like.

The disk drive 945 performs signal recording and reproduction on a mounted optical disk. The optical disk may be a DVD (such as a DVD-Video, a DVD-RAM, a DVD-R, a DVD-RW, a DVD+R, or a DVD+RW) or a Blu-ray disc, for example.

The selector 946 selects an encoded bit stream from the tuner 941 or the encoder 943 at the time of video and audio recording, and supplies the encoded bit stream to either the HDD unit 944 or the disk drive 945. The selector 946 also supplies an encoded bit stream output from the HDD unit 944 or the disk drive 945 to the decoder 947 at the time of video and audio reproduction.

The decoder 947 performs a decoding operation on an encoded bit stream. The decoder 947 supplies the video data generated by performing the decoding operation to the OSD unit 948. The decoder 947 also outputs the audio data generated by performing the decoding operation.

The OSD unit 948 also generates video data for displaying a menu screen or the like for item selection, and superimposes the video data on video data output from the decoder 947.

The user interface unit 950 is connected to the control unit 949. The user interface unit 950 is formed with operation switches, a remote control signal receiving unit, and the like, and supplies an operating signal according to a user operation to the control unit 949.

The control unit 949 is formed with a CPU, a memory, and the like. The memory stores the program to be executed by the CPU, and various kinds of data necessary for the CPU to perform operations. The program stored in the memory is read and executed by the CPU at a predetermined time such as the time of activation of the recording/reproducing device 940. The CPU executes the program to control the respective components so that the recording/reproducing device 940 operates in accordance with a user operation.

In the recording/reproducing device having the above structure, the encoder 943 has the functions of an image processing device (an image processing method) of the present invention. Accordingly, the occlusion regions of color images and depth images of the viewpoints other than the reference point can be transmitted so that high-quality color images and depth images of the viewpoints other than the reference point can be generated on the receiving end.

Sixth Embodiment

Example Structure of an Imaging Device

Figure 24:
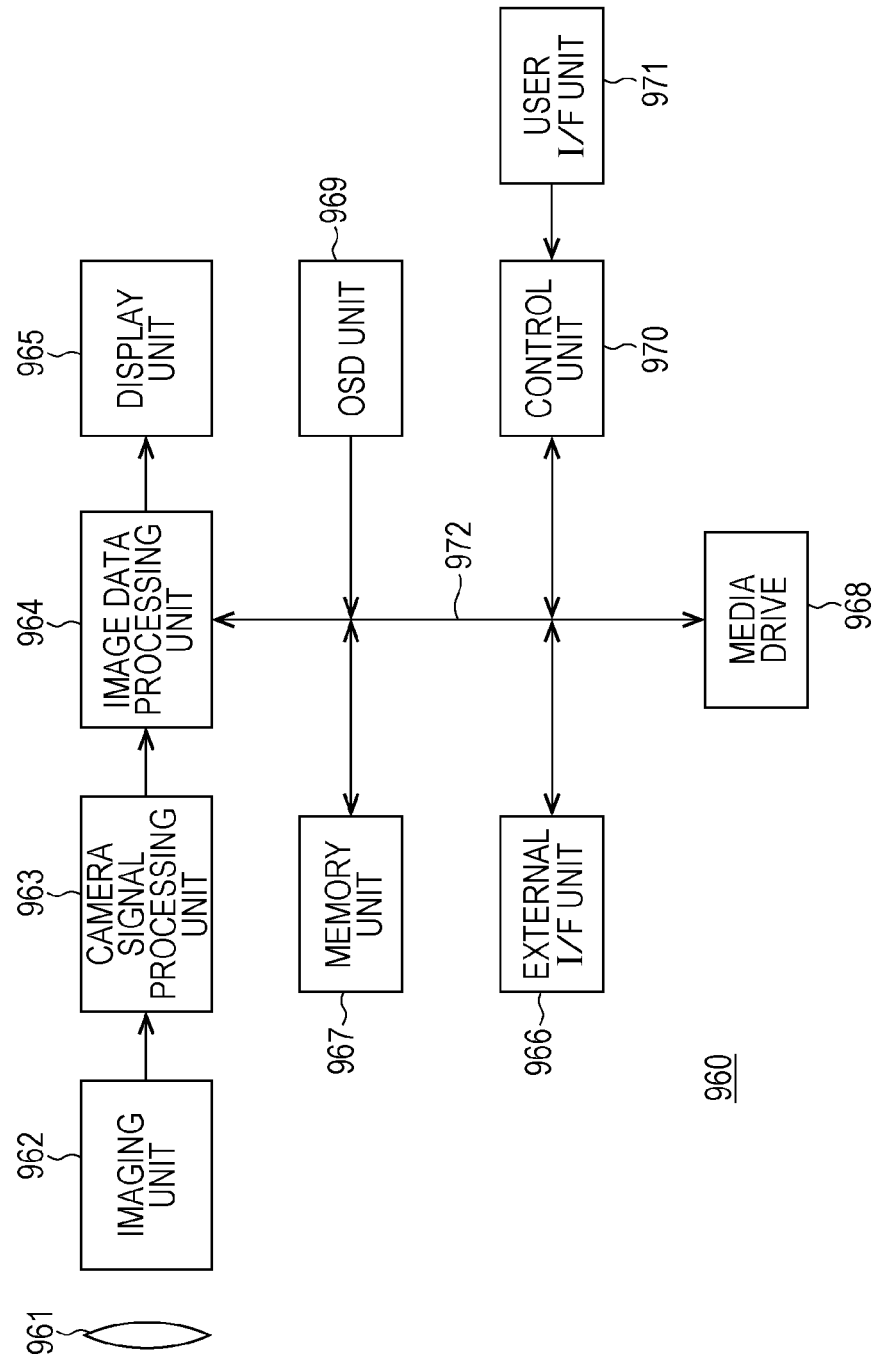
FIG. 24 is a block diagram showing an example structure of an imaging device to which the present technique is applied.

FIG. 24 schematically shows an example structure of an imaging apparatus to which the present technique is applied. An imaging device 960 captures an image of an object, and causes a display unit to display the image of the object or records the image as image data on a recording medium.

The imaging device 960 includes an optical block 961, an imaging unit 962, a camera signal processing unit 963, an image data processing unit 964, a display unit 965, an external interface unit 966, a memory unit 967, a media drive 968, an OSD unit 969, and a control unit 970. A user interface unit 971 is connected to the control unit 970. Further, the image data processing unit 964, the external interface unit 966, the memory unit 967, the media drive 968, the OSD unit 969, the control unit 970, and the like are connected via a bus 972.

The optical block 961 is formed with a focus lens, a diaphragm, and the like. The optical block 961 forms an optical image of an object on the imaging surface of the imaging unit 962. Formed with a CCD or a CMOS image sensor, the imaging unit 962 generates an electrical signal in accordance with the optical image through a photoelectric conversion, and supplies the electrical signal to the camera signal processing unit 963.

The camera signal processing unit 963 performs various kinds of camera signal processing such as a knee correction, a gamma correction, and a color correction on the electrical signal supplied from the imaging unit 962. The camera signal processing unit 963 supplies the image data subjected to the camera signal processing to the image data processing unit 964.

The image data processing unit 964 performs an encoding operation on the image data supplied from the camera signal processing unit 963. The image data processing unit 964 supplies the encoded data generated by performing the encoding operation, to the external interface unit 966 and the media drive 968. The image data processing unit 964 also performs a decoding operation on the encoded data supplied from the external interface unit 966 and the media drive 968. The image data processing unit 964 supplies the image data generated by performing the decoding operation to the display unit 965. The image data processing unit 964 also performs an operation to supply the image data supplied from the camera signal processing unit 963 to the display unit 965, or superimposes display data obtained from the OSD unit 969 on the image data and supplies the image data to the display unit 965.

The OSD unit 969 generates display data of a menu screen and icons formed with symbols, characters, or figures, and outputs the data to the image data processing unit 964.

The external interface unit 966 is formed with a USB input/output terminal and the like, for example, and is connected to a printer when image printing is performed. A drive is also connected to the external interface unit 966 where necessary, and a removable medium such as a magnetic disk or an optical disk is mounted on the drive as appropriate. A computer program read from such a removable disk is installed where necessary. Further, the external interface unit 966 includes a network interface connected to a predetermined network such as a LAN or the internet. The control unit 970 reads encoded data from the memory unit 967 in accordance with an instruction from the user interface unit 971, for example, and can supply the encoded data from the external interface unit 966 to another device connected thereto via a network. The control unit 970 can also obtain, via the external interface unit 966, encoded data or image data supplied from another device via a network, and supply the encoded data or image data to the image data processing unit 964.

A recording medium to be driven by the media drive 968 may be a readable/rewritable removable medium such as a magnetic disk, a magnetooptical disk, an optical disk, or a semiconductor memory. The recording medium may be any type of removable medium, and may be a tape device, a disk, or a memory card. The recording medium may of course be a non-contact IC card or the like.

Alternatively, the media drive 968 and a recording medium may be integrated, and may be formed with an immobile storage medium such as an internal hard disk drive or a SSD (Solid State Drive).

The control unit 970 is formed with a CPU, a memory, and the like. The memory stores the program to be executed by the CPU, various kinds of data necessary for the CPU to perform operations, and the like. The program stored in the memory is read and executed by the CPU at a predetermined time such as the time of activation of the imaging device 960. The CPU executes the program to control the respective components so that the imaging device 960 operates in accordance with a user operation.

In the imaging apparatus having the above structure, the image data processing unit 964 has the functions of an image processing device (an image processing method) of the present invention. Accordingly, the occlusion regions of color images and depth images of the viewpoints other than the reference point can be transmitted so that high-quality color images and depth images of the viewpoints other than the reference point can be generated on the receiving end even if the precision of the reference-point depth image is low. Also, when the occlusion regions of color images and depth images of the viewpoints other than the reference point are transmitted, high-quality color images and depth images of the viewpoints other than the reference point can be generated even if the precision of the reference-point depth image is low.

It should be noted that embodiments of the present technique are not limited to the above described embodiments, and various modifications may be made to them without departing from the scope of the present technique.

REFERENCE SIGNS LIST

31 Warping unit, 51 Format conversion device, 52 Inverse format conversion device, 71 Warping unit, 72 Occlusion determining unit, 73, 74 Warping units, 75 Occlusion determining unit, 76 Warping unit, 77 Screen multiplexing unit, 78 Chroma component converting unit, 121 Warping unit, 122 Chroma component converting unit, 123, 124 Screen combining units, 151 Warping unit, 152 Color correlation determining unit, 154 Warping unit, 155 Color correlation determining unit, 157 Screen multiplexing unit, 201 Warping unit, 202 Color correlation determining unit, 204 Warping unit, 205 Color correlation determining unit, 207 Screen multiplexing unit

The invention claimed is:

1. An image processing device comprising:
   a non-reference viewpoint warping unit configured to perform a warping operation toward a non-reference viewpoint on one of a depth image and a color image of a reference viewpoint, the reference viewpoint being a viewpoint serving as a reference point, the non-reference viewpoint being a viewpoint other than the reference viewpoint;
   a detecting unit configured to detect an occlusion region by using one of a depth image and a color image of the non-reference viewpoint, the occlusion region being formed when a viewpoint is converted from the reference viewpoint to the non-reference viewpoint, the depth image and the color image of the non-reference viewpoint being obtained through the warping operation performed by the non-reference viewpoint warping unit;
   a transmitting unit configured to transmit the occlusion region of the depth image of the non-reference viewpoint; and
   a multiplexer configured to generate a depth multiplexed image by multiplexing a first occlusion region of a depth image of a first non-reference viewpoint and a second occlusion region of a depth image of a second non-reference viewpoint, the first occlusion region being formed when a viewpoint is converted from the reference viewpoint to the first non-reference viewpoint, the second occlusion region being formed when a viewpoint is converted from the reference viewpoint to the second non-reference viewpoint,
   wherein the transmitting unit transmits the depth multiplexed image generated by the multiplexer.

2. The image processing device according to claim 1, wherein the multiplexer multiplexes the first occlusion region of the depth image of the first non-reference viewpoint and the second occlusion region of the depth image of the second non-reference viewpoint into one screen.

3. The image processing device according to claim 2, further comprising
a setting unit configured to set identification information for determining whether a value of each pixel of the depth multiplexed image is a value of the first occlusion region, whether the value of each pixel of the depth multiplexed image is a value of the second occlusion region, and whether the value of each pixel of the depth multiplexed image is a common value between the first occlusion region and the second occlusion region,
wherein the transmitting unit transmits the depth multiplexed image generated by the multiplexer and the identification information set by the setting unit.

4. The image processing device according to claim 2, further comprising
a setting unit configured to set identification information for determining whether a value of each pixel of the depth multiplexed image is a value of the first occlusion region, and whether the value of each pixel of the depth multiplexed image is a value of the second occlusion region,
wherein the transmitting unit transmits the depth multiplexed image generated by the multiplexer and the identification information set by the setting unit.

5. The image processing device according to claim 2, further comprising
a setting unit configured to set identification information for determining whether a value of each pixel of the depth multiplexed image is a common value between the first occlusion region and the second occlusion region,
wherein the transmitting unit transmits the depth multiplexed image generated by the multiplexer and the identification information set by the setting unit.

6. The image processing device according to claim 1, wherein
the multiplexer generates a color multiplexed image by multiplexing the first occlusion region of a color image of the first non-reference viewpoint and the second occlusion region of a color image of the second non-reference viewpoint, and
the transmitting unit transmits the color multiplexed image generated by the multiplexer.

7. The image processing device according to claim 6, wherein the multiplexer multiplexes the first occlusion region of the color image of the first non-reference viewpoint and the second occlusion region of the color image of the second non-reference viewpoint into one screen.

8. An image processing device comprising:
a non-reference viewpoint warping unit configured to perform a warping operation toward a non-reference viewpoint on one of a depth image and a color image of a reference viewpoint, the reference viewpoint being a viewpoint serving as a reference point, the non-reference viewpoint being a viewpoint other than the reference viewpoint;
a detecting unit configured to detect an occlusion region by using one of a depth image and a color image of the non-reference viewpoint, the occlusion region being formed when a viewpoint is converted from the reference viewpoint to the non-reference viewpoint, the depth image and the color image of the non-reference viewpoint being obtained through the warping operation performed by the non-reference viewpoint warping unit; and
a transmitting unit configured to transmit the occlusion region of the depth image of the non-reference viewpoint,
wherein the detecting unit detects a pixel without a depth value as the occlusion region, the pixel without a pixel value being detected from the depth image of the non-reference viewpoint obtained through the warping operation performed by the non-reference viewpoint warping unit,
wherein the detecting unit corrects the occlusion region by adding a peripheral pixel detected as the occlusion region to the occlusion region, the peripheral pixel being located around a pixel not detected as the occlusion region, and
the transmitting unit transmits the corrected occlusion region of the depth image of the non-reference viewpoint.

9. An image processing device comprising:
a non-reference viewpoint warping unit configured to perform a warping operation toward a non-reference viewpoint on one of a depth image and a color image of a reference viewpoint, the reference viewpoint being a viewpoint serving as a reference point, the non-reference viewpoint being a viewpoint other than the reference viewpoint;
a detecting unit configured to detect an occlusion region by using one of a depth image and a color image of the non-reference viewpoint, the occlusion region being formed when a viewpoint is converted from the reference viewpoint to the non-reference viewpoint, the depth image and the color image of the non-reference viewpoint being obtained through the warping operation performed by the non-reference viewpoint warping unit; and
a transmitting unit configured to transmit the occlusion region of the depth image of the non-reference viewpoint,
wherein, when a difference between a color image of the non-reference viewpoint obtained through the warping operation performed by the non-reference viewpoint warping unit and a color image of the non-reference viewpoint is equal to or larger than a threshold value, the detecting unit detects a region corresponding to the difference as a low-correlation region including the occlusion region, and
the transmitting unit transmits the low-correlation region of the depth image of the non-reference viewpoint.

* * * * *